(12) United States Patent
Shimizu et al.

(10) Patent No.: US 12,105,335 B2
(45) Date of Patent: *Oct. 1, 2024

(54) OPTICAL FIBER CABLE

(71) Applicant: AFL Telecommunications LLC, Duncan, SC (US)

(72) Inventors: Shogo Shimizu, Sakura (JP); Akira Namazue, Sakura (JP); Ken Osato, Sakura (JP)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,484

(22) Filed: Feb. 9, 2024

(65) Prior Publication Data

US 2024/0184071 A1 Jun. 6, 2024

Related U.S. Application Data

(63) Continuation of application No. 18/350,446, filed on Jul. 11, 2023, which is a continuation of application
(Continued)

(30) Foreign Application Priority Data

Oct. 11, 2018 (JP) ................................ 2018-192706

(51) Int. Cl.
*G02B 6/44* (2006.01)

(52) U.S. Cl.
CPC ......... *G02B 6/4432* (2013.01); *G02B 6/4403* (2013.01); *G02B 6/4405* (2013.01); *G02B 6/4404* (2013.01); *G02B 6/441* (2013.01)

(58) Field of Classification Search
CPC .. G02B 6/4403; G02B 6/4404; G02B 6/4405; G02B 6/441; G02B 6/4432
See application file for complete search history.

(56) References Cited

U.S. PATENT DOCUMENTS

| 4,534,618 A | 8/1985 | Briiggendieck |
| 4,723,831 A | 2/1988 | Johnson et al. |

(Continued)

FOREIGN PATENT DOCUMENTS

| CN | 201788750 | 4/2011 |
| CN | 102057309 | 5/2011 |

(Continued)

OTHER PUBLICATIONS

European Opposition against European Patent No. EP 3796060, dated Sep. 28, 2023, 36 pages.
(Continued)

*Primary Examiner* — Ryan A Lepisto
(74) *Attorney, Agent, or Firm* — Dority & Manning, P.A.

(57) ABSTRACT

An optical fiber cable includes: a sheath; a core that is housed in the sheath and comprises optical fibers; tensile strength members embedded in the sheath; and ripcords embedded in the sheath. Recesses and protrusions are disposed alternately in a circumferential direction on an outer circumferential surface of the sheath. The recesses each include: two connecting portions respectively connected to radial inner ends of two adjacent protrusions; and a bottom surface positioned between the two connecting portions. In a transverse cross-sectional view, the ripcords are positioned inside some of the protrusions, and the tensile strength members are positioned inside the remaining protrusions.

21 Claims, 17 Drawing Sheets

Related U.S. Application Data

No. 18/331,602, filed on Jun. 8, 2023, which is a continuation of application No. 17/671,886, filed on Feb. 15, 2022, now Pat. No. 11,709,329, which is a continuation of application No. 17/255,581, filed as application No. PCT/JP2019/039740 on Oct. 9, 2019, now Pat. No. 11,287,591.

(56) References Cited

U.S. PATENT DOCUMENTS

| | | | |
|---|---|---|---|
| 6,611,646 | B1 | 8/2003 | Norris et al. |
| 6,778,744 | B2 | 8/2004 | Norris et al. |
| 6,912,347 | B2 | 6/2005 | Rossi et al. |
| 6,963,686 | B2 | 11/2005 | Moon |
| 7,087,841 | B2 | 8/2006 | Fett et al. |
| 7,302,144 | B2 | 11/2007 | Um et al. |
| 8,548,294 | B2 | 10/2013 | Toge et al. |
| 9,075,219 | B2 | 7/2015 | Blackley |
| 9,201,208 | B2 | 12/2015 | Gimblet et al. |
| 9,261,658 | B2 | 2/2016 | Andrzejewski et al. |
| 9,268,102 | B2 | 2/2016 | Daems et al. |
| 9,459,422 | B2 | 10/2016 | Gimblet et al. |
| 11,029,477 | B2 | 6/2021 | Sato et al. |
| 11,287,591 | B2 * | 3/2022 | Shimizu .......... G02B 6/4432 |
| 11,709,329 | B2 * | 7/2023 | Shimizu .......... G02B 6/4403 385/24 |
| 2002/0129967 | A1 | 9/2002 | Fett et al. |
| 2005/0117858 | A1 | 6/2005 | Lee |
| 2010/0322572 | A1 | 12/2010 | Sakabe et al. |
| 2011/0110635 | A1 | 5/2011 | Toge et al. |
| 2013/0037209 | A1 | 2/2013 | Ohhashi et al. |
| 2015/0192748 | A1 | 7/2015 | Sato et al. |
| 2016/0299311 | A1 | 10/2016 | Kaji et al. |
| 2020/0142144 | A1 | 5/2020 | Blazer et al. |
| 2020/0209505 | A1 | 7/2020 | Ohno et al. |

FOREIGN PATENT DOCUMENTS

| | | |
|---|---|---|
| CN | 102183830 | 9/2011 |
| CN | 202110315 U | 1/2012 |
| CN | 103513358 | 1/2014 |
| CN | 203519900 | 4/2014 |
| CN | 104698559 | 6/2015 |
| CN | 105492951 | 4/2016 |
| CN | 105980901 | 9/2016 |
| CN | 107861210 | 3/2018 |
| CN | 207409308 | 5/2018 |
| CN | 207601394 | 7/2018 |
| CN | 209728274 | 12/2019 |
| EP | 0845691 | 6/1998 |
| EP | 1403671 | 3/2004 |
| EP | 2579079 A1 | 4/2013 |
| EP | 3879323 | 9/2021 |
| EP | 3923053 A1 | 12/2021 |
| EP | 3988977 | 4/2022 |
| JP | S5811907 | 1/1983 |
| JP | H02071808 | 5/1990 |
| JP | H0369105 | 7/1991 |
| JP | H04324804 | 11/1992 |
| JP | H04336505 | 11/1992 |
| JP | H0688928 | 3/1994 |
| JP | H06300946 | 10/1994 |
| JP | H09152531 | 6/1997 |
| JP | 2000019366 | 1/2000 |
| JP | 2000121893 | 4/2000 |
| JP | 2001021781 | 1/2001 |
| JP | 2003004998 | 1/2003 |
| JP | 2003536210 | 12/2003 |
| JP | 2004184538 | 7/2004 |
| JP | 2005043877 | 2/2005 |
| JP | 2005208430 | 8/2005 |
| JP | 2006330261 | 12/2006 |
| JP | 2007033729 | 2/2007 |
| JP | 2007517255 | 6/2007 |
| JP | 2007279226 | 10/2007 |
| JP | 2008197258 | 8/2008 |
| JP | 2009080347 | 4/2009 |
| JP | 2009237341 | 10/2009 |
| JP | 2010008923 | 1/2010 |
| JP | 2012002912 | 1/2012 |
| JP | 4902580 | 3/2012 |
| JP | 5193015 | 5/2013 |
| JP | 2013088641 | 5/2013 |
| JP | 5223013 | 6/2013 |
| JP | 2013109172 | 6/2013 |
| JP | 2013156307 | 8/2013 |
| JP | 5298989 | 9/2013 |
| JP | 5351503 | 11/2013 |
| JP | 5598853 | 10/2014 |
| JP | 5685298 | 3/2015 |
| JP | 2015166806 | 9/2015 |
| JP | 2015169756 | 9/2015 |
| JP | 2016080747 | 5/2016 |
| JP | 2016177138 A | 10/2016 |
| JP | 2017097089 | 6/2017 |
| JP | 2018136376 | 8/2018 |
| KR | 20060120097 | 11/2006 |
| KR | 101140219 | 5/2012 |
| MX | 2014009947 | 11/2014 |
| RU | 2591232 | 7/2016 |
| RU | 2618780 | 5/2017 |
| RU | 2619816 | 5/2017 |
| RU | 2634791 | 11/2017 |
| RU | 2707655 | 11/2019 |
| WO | WO2005010565 | 2/2005 |
| WO | WO2005047950 | 5/2005 |
| WO | WO2013/126429 | 8/2013 |
| WO | WO2013129475 | 9/2013 |
| WO | WO2018062365 A1 | 4/2018 |
| WO | WO2018/174004 | 9/2018 |
| WO | WO2020/256019 | 12/2020 |

OTHER PUBLICATIONS

International Search Report issued in corresponding International Application No. PCT/JP2019/039740 dated Dec. 3, 2019, 2 pages.

Office Action issued in counterpart European Patent Application No. 19870931.3 dated Sep. 6, 2021, 66 pages.

U.S. Final Office Action for corresponding U.S. Appl. No. 18/350,446, mailed Feb. 2, 2024, 13 pages.

U.S. Non-Final Office Action for corresponding U.S. Appl. No. 18/350,446, mailed Nov. 2, 2023, 14 pages.

U.S. Non-Final Office Action for corresponding U.S. Appl. No. 17/671,886, mailed Nov. 28, 2022. 13 pages.

U.S. Non-Final Office Action issued in parent U.S. Appl. No. 17/255,581 dated Aug. 31, 2021, 18 pages.

U.S. Notice of Allowance for corresponding U.S. Appl. No. 17/255,581, mailed Nov. 16, 2021, pages.

U.S. Notice of Allowance for corresponding U.S. Appl. No. 17/671,886, mailed Mar. 8, 2023, 8 Pages.

European Brief Communication Corresponding to Application No. 19870931 on Jul. 1, 2024.

AFL Global, "Enterprise Blown Fiber (eABF) Cable", AFL Duraline brochure, 2013, 6 pages.

Fujikura LTD. Head Office, "Wrapping Tube Cable with Spider Wed Ribbon®", Fujikura, Japan, 2017, 2 pages.

IWCS, "65th International Cable and Connectivity Symposium (IWCS 2016), Industry Leadership, Innovation and Professional Development", International Wire and Cable Symposium (IWCS), Rhode Island, Oct. 2016, 8 pages.

Nippon Telegraph and Telephone Corporation, "Development of world's highest-density optical fiber cable", PHYS.org, Jul. 4, 2012, 3 pages.

OFS, "OFS Expands Outside Plant and Premise Cable Product Lines to Include New Rollable Ribbon Technology", News Release, Orlando, FL, Sep. 5, 2017, 2 pages.

Sato et al., "Ultra-High-Fiber-Count and High-Density Slotted Core Cable with Pliable 12-Fiber Ribbons", Sumitomo Electric Industries, Ltd., International Wire & Cable Symposium 65th IWCS Conference, Printed in 2017, 6 pages.

(56) References Cited

OTHER PUBLICATIONS

Tsukamoto et al., "Ultra-High Density Optical Fiber Cable with Rollable Multicore Fiber Ribbon", Furukawa Electric Co., Ltd., International Wire & Cable Symposium 65$^{th}$ IWCS Conference, Printed in 2017, 6 pages.
Wikipedia, "Fillet (mechanics)", Article dated Nov. 27, 2017, Retrieved from Wayback Machine, 1 page.
Wikipedia, "Stress concentration", Article dated Dec. 13, 2017, Retrieved from Wayback Machine, 1 page.

* cited by examiner

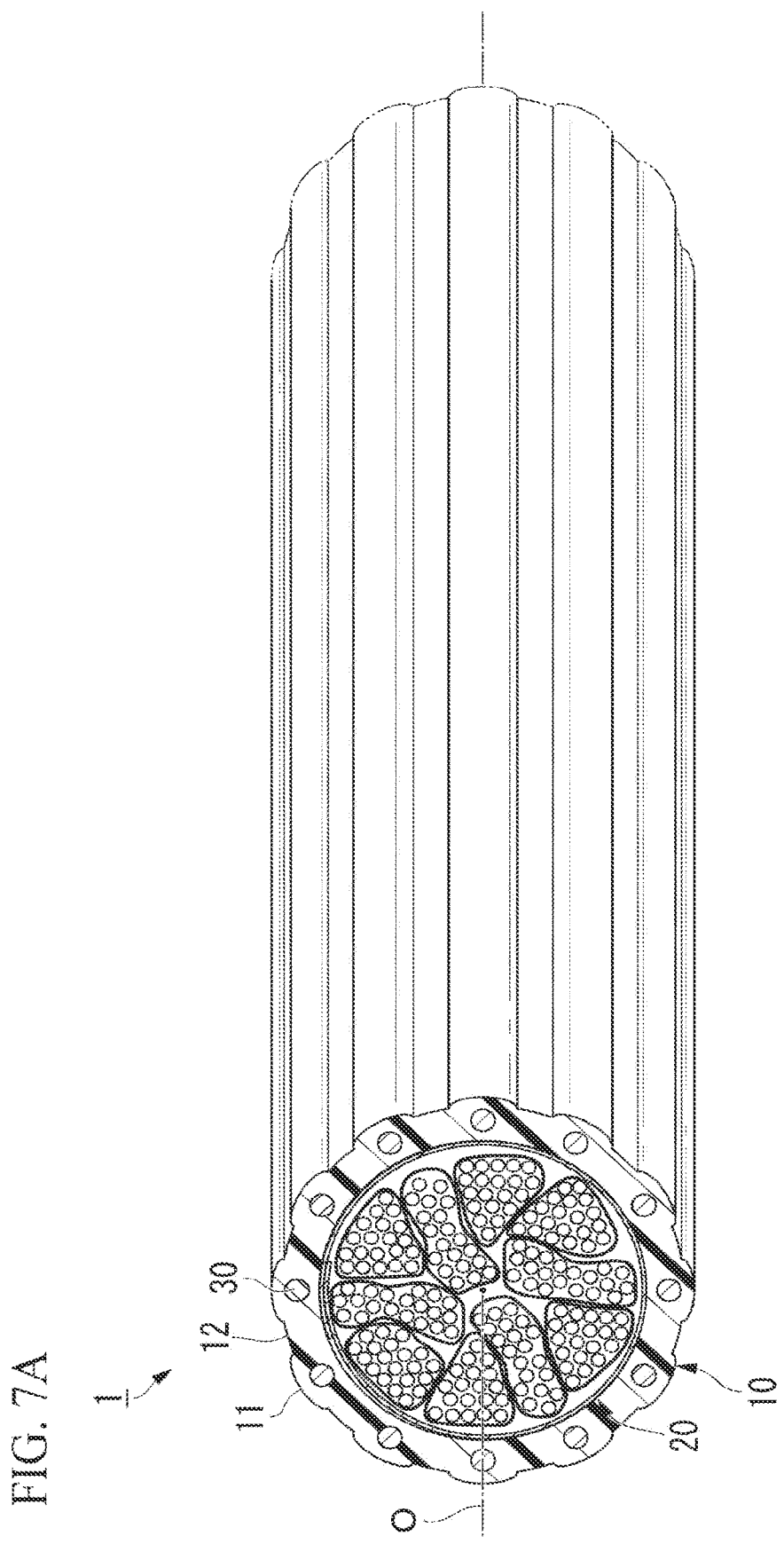

OPTICAL FIBER CABLE

CROSS-REFERENCE TO RELATED APPLICATIONS

This present application is a continuation of U.S. patent application Ser. No. 18/350,446, filed on Jul. 11, 2023, which is a continuation of U.S. patent application Ser. No. 18/331,602, filed on Jun. 8, 2023, which is a continuation of U.S. patent application Ser. No. 17/671,886, filed on Feb. 15, 2022 (U.S. Pat. No. 11,709,329), which is a continuation of U.S. patent application Ser. No. 17/255,581, filed on Dec. 23, 2020 (U.S. Pat. No. 11,287,591), which is a National Stage Patent Application of PCT/JP2019/039740, filed on Oct. 9, 2019, which claims the benefit of priority to Japanese Patent Application No. 2018-192706, filed on Oct. 11, 2018, the disclosures of all of which are incorporated by reference herein in their entireties.

TECHNICAL FIELD

The present invention relates to an optical fiber cable.

BACKGROUND

In the related art, an optical fiber cable as illustrated in Patent Document 1 has been known. This optical fiber cable includes a sheath and a plurality of optical fibers housed in the sheath. The outer circumferential surface of the sheath is formed with recesses and protrusions alternately disposed in the circumferential direction. The plurality of optical fibers in Patent Document 1 are housed in a tube in a twisted state. Alternatively, the plurality of optical fibers are collectively coated with a UV curable resin to form a tape core wire.

PATENT LITERATURE

Patent Literature 1: U.S. Pat. No. 6,963,686

In the optical fiber cable of Patent Document 1, the recess is a V-shaped groove. Therefore, for example, when a force in the circumferential direction is applied to the protrusion, the stress tends to concentrate on the inner end portion of the groove, and the sheath tends to crack.

Further, it has been found that the configuration in which a plurality of optical fibers are simply twisted and housed in the tube lacks the rigidity of the optical fiber cable and is disadvantageous in terms of air-blowing characteristics. On the other hand, in a configuration in which a plurality of optical fibers are collectively coated with a resin, the rigidity of the optical fiber cable can be obtained. However, when the optical fiber is collectively coated with resin, the core becomes large, which is disadvantageous in terms of reducing the diameter of the cable, and the strain applied to the optical fiber also becomes large, which is disadvantageous in terms of transmission loss.

The present invention has been made in consideration of such circumstances, and provides an optical fiber cable which is advantageous in terms of air-blowing characteristics, diameter reduction, and transmission loss while increasing the strength of the sheath.

SUMMARY

An optical fiber cable according to one or more embodiments of the present invention includes a sheath and a core which is housed in the sheath and which has an intermittently-adhered optical fiber ribbon including a plurality of optical fibers and a plurality of adhesive portions for intermittently adhering the plurality of optical fibers in a longitudinal direction, in which recesses and protrusions are formed so as to be disposed alternately in a circumferential direction on an outer circumferential surface of the sheath, and the recesses each include two connecting portions respectively connected to radial inner ends of two adjacent protrusions, and a bottom surface positioned between the two connecting portions.

According to the above-described embodiments of the present invention, it is possible to provide an optical fiber cable which is advantageous in terms of air-blowing characteristics, diameter reduction, and transmission loss while increasing the strength of the sheath.

BRIEF DESCRIPTION OF THE DRAWINGS

FIG. 7A is a diagram illustrating a case where a protrusion and a tensile strength member extend linearly.

DETAILED DESCRIPTION

Hereinafter, an optical fiber cable of one or more embodiments will be described with reference to the drawings.

Figure 1A:
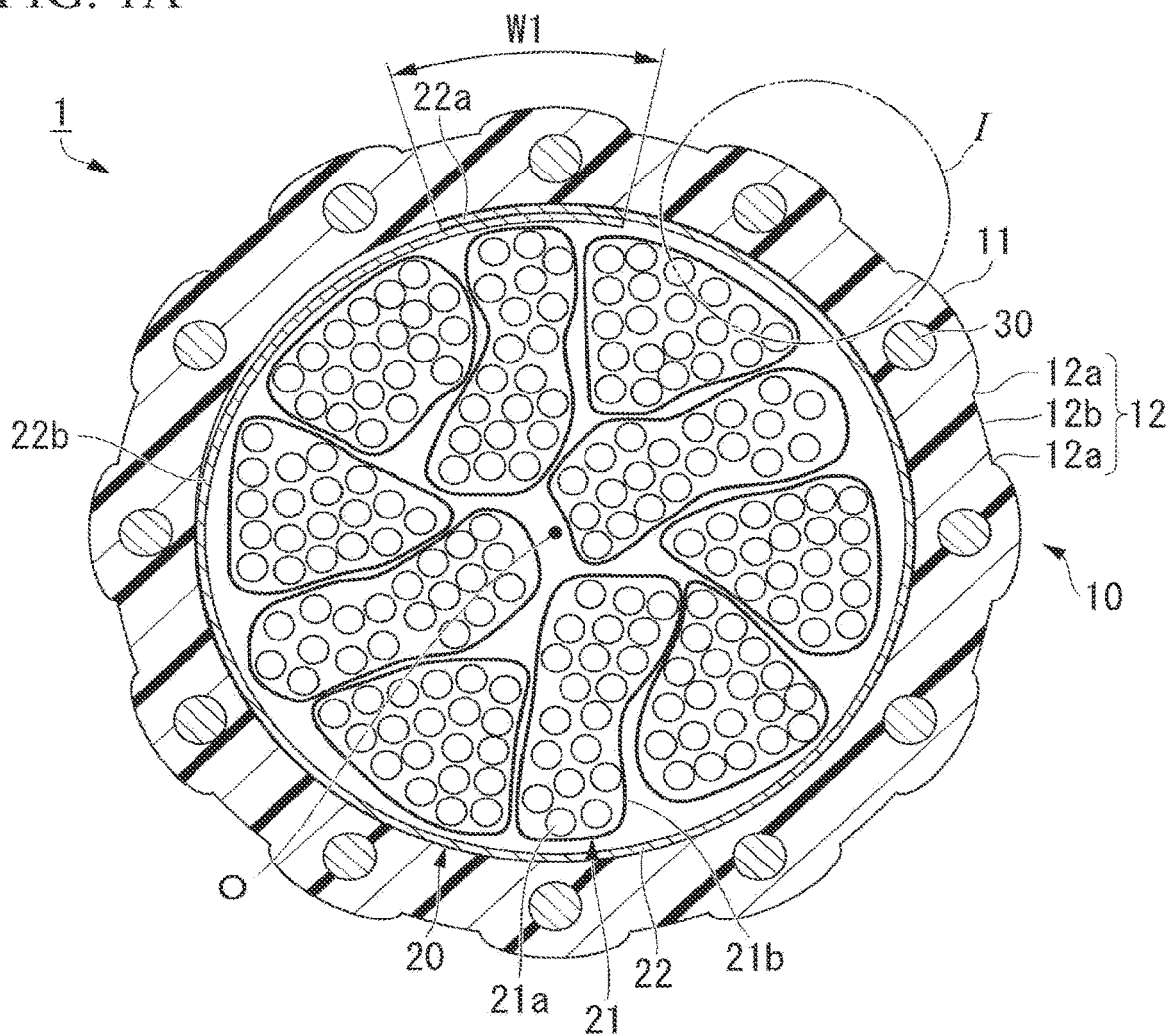
FIG. 1A is a transverse cross-sectional view of an optical fiber cable according to one or more embodiments.

As illustrated in FIG. 1A, the optical fiber cable 1 includes a sheath 10, a core 20 housed in the sheath 10, and a plurality of tensile strength members 30 embedded in the sheath 10.

The core 20 has a plurality of optical fiber units 21, and a wrapping tube 22 that wraps these optical fiber units 21. Each of the optical fiber units 21 has a plurality of optical fibers 21a and a binding material 21b that binds the optical fibers 21a.

(Direction Definition)

In one or more embodiments, the central axis of the optical fiber cable 1 is referred to as the central axis O. Further, the longitudinal direction of the optical fiber cable 1 (longitudinal direction of the optical fiber 21a) is simply referred to as the longitudinal direction. The cross-section orthogonal to the longitudinal direction is referred to as a transverse cross-section. In the transverse cross-sectional view (FIG. 1A), a direction intersecting the central axis O is referred to as a radial direction, and a direction revolving around the central axis O is referred to as a circumferential direction.

When the optical fiber cable 1 is non-circular in the transverse cross-sectional view, the central axis O is positioned at the center of the optical fiber cable 1.

Figure 2:
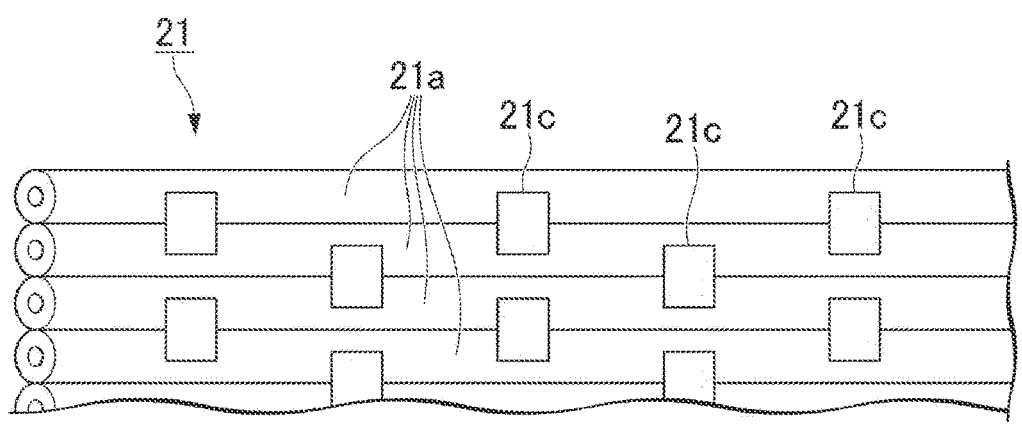
FIG. 2 is a schematic view of an intermittently-adhered optical fiber ribbon.

As illustrated in FIG. 2, the optical fiber unit 21 of one or more embodiments is a so-called intermittently-adhered optical fiber ribbon. That is, the optical fiber unit 21 has a plurality of optical fibers 21a, and a plurality of adhesive portions 21c for adhering adjacent optical fibers 21a to each other. In the intermittently-adhered optical fiber ribbon, when a plurality of optical fibers 21a are pulled in a direction orthogonal to the longitudinal direction, the optical fibers 21a spread in a mesh shape (spider web shape). Specifically, one optical fiber 21a is adhered to the adjacent optical fibers 21a at different positions in the longitudinal direction by the adhesive portions 21c. Further, the adjacent optical fibers 21a are adhered to each other by the adhesive portion 21c at a certain interval in the longitudinal direction.

As the adhesive portion 21c, a thermosetting resin, a UV curable resin, or the like can be used.

The plurality of optical fiber units 21 are twisted together about the central axis O. The aspect of twisting may be spiral or SZ.

The wrapping tube 22 wraps a plurality of optical fiber units 21 and is formed into a cylindrical shape. Both end portions (first end portion and second end portion) of the wrapping tube 22 in the circumferential direction are overlapped with each other to form a wrap portion 22a. The portion of the wrapping tube 22 excluding the wrap portion 22a is referred to as a non-wrap portion 22b. The non-wrap portion 22b is positioned between the first end portion and the second end portion forming the wrap portion 22a.

As the material of the wrapping tube 22, a non-woven fabric, a plastic tape member, or the like can be used. When the wrapping tube 22 is made of plastic, polyethylene terephthalate, polyester or the like can be used as the material. Further, as the wrapping tube 22, a water-absorbing tape obtained by imparting water absorbency to the above-described non-woven fabric or tape member may be used. In this case, the waterproof performance of the optical fiber cable 1 can be improved. When a plastic tape member is used as the wrapping tube 22, water absorbency may be imparted by applying a water absorbing powder to the surface of the tape member.

The plurality of tensile strength members 30 are embedded in the sheath 10 at equal intervals in the circumferential direction. The intervals at which the plurality of tensile strength members 30 are embedded may not be equal. The number of tensile strength members 30 can be changed as appropriate. As the material of the tensile strength member 30, for example, metal wire (steel wire or the like), tensile strength fiber (aramid fiber or the like), Fiber Reinforced Plastics (FRP) or the like can be used. As specific examples of FRP, KFRP using Kevlar fiber and PBO-FRP using poly-paraphenylene benzobisoxazole (PBO) can be used.

In addition to the tensile strength member 30, for example, a ripcord or the like may be embedded in the sheath 10.

The sheath 10 is formed into a cylindrical shape centered on the central axis O. As the material of the sheath 10, polyolefin (PO) resin such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used.

A plurality of recesses 12 and protrusions 11 are formed on the outer circumferential surface of the sheath 10. The recesses (concavities) 12 and the protrusions (convexities) 11 are disposed alternately in the circumferential direction. In this way, an uneven shape is formed on the outer circumferential surface of the sheath 10. The recesses 12 and the protrusions 11 extend along the longitudinal direction.

The protrusion 11 is disposed at the same position as the tensile strength member 30 in the circumferential direction. In other words, the protrusion 11 is positioned on a straight line extending from the central axis O toward the center of the tensile strength member 30 in the transverse cross-sectional view. The recess 12 is disposed at a position different from that of the tensile strength member 30 in the circumferential direction. In other words, the recess 12 is not positioned on a straight line extending from the central axis O toward the center of the tensile strength member 30 in the transverse cross-sectional view.

Figure 1B:
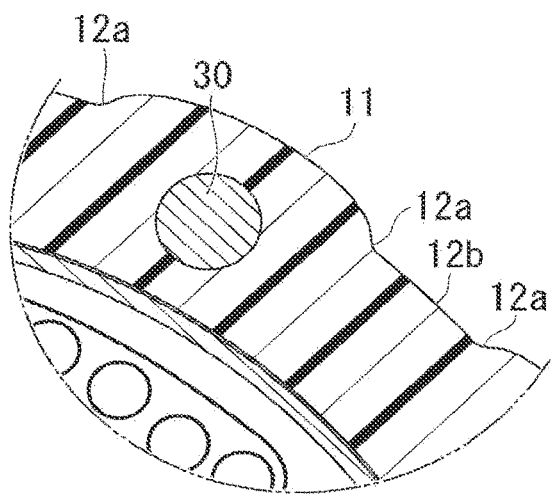
FIG. 1B is an enlarged view of a part I of FIG. 1A.

The recess 12 has two connecting portions 12a and a bottom surface 12b. The connecting portion 12a is connected to the radial inner end of the protrusion 11 adjacent in the circumferential direction. The bottom surface 12b is positioned between the two connecting portions 12a in each recess 12. As illustrated in FIG. 1B, the connecting portions 12a are formed in a curved surface shape that is radially inward convex.

The bottom surface 12b has a curved surface centered on the central axis O, and has an arc shape centered on the central axis O in a transverse cross-sectional view. However, the shape of the bottom surface 12b is not limited to a curved surface centered on the central axis O. For example, the bottom surface 12b may have a shape in which two connecting portions 12a are connected in a straight line.

As described above, since each of the recesses 12 has the two connecting portions 12a and the bottom surface 12b positioned between the connecting portions 12a, even if a force in the circumferential direction acts on the protrusion 11, a stress is hardly concentrated in the recess 12. Therefore, cracks and the like are suppressed in the recess 12, and the strength of the sheath 10 is increased.

Further, the core 20 of one or more embodiments has an intermittently-adhered optical fiber ribbon (optical fiber unit 21) including a plurality of optical fibers 21a and a plurality of adhesive portions 21c for intermittently adhering the plurality of optical fibers 21a in the longitudinal direction. Thus, the rigidity of the optical fiber cable 1 is ensured as compared with the case where a plurality of optical fibers, which are not adhered, are simply twisted, and the structure is advantageous in buckling resistance and air-blowing characteristics. Further, as compared with the case where a plurality of optical fibers are collectively coated with a resin, the diameter of the optical fiber cable 1 can be reduced, and an increase in transmission loss can be suppressed.

Further, the connecting portion 12a is formed into a curved surface shape that is radially inward convex. Thus, the concentration of stress on the connecting portion 12a is more reliably suppressed, and the strength of the sheath 10 can be further increased.

Further, since the wrapping tube 22 has the wrap portion 22a, it is possible to prevent the sheath 10 from coming into contact with the constituent members inside the wrapping tube 22. Thus, when the sheath 10 is extruded and molded, it is possible to prevent the optical fiber 21a from being taken into the softened sheath 10 and the extra-length ratio of the optical fiber 21a to the optical fiber cable from becoming unstable. Further, it is possible to suppress an increase in transmission loss due to the optical fiber 21a being sandwiched between the wrapping tube 22 and the sheath 10.

The radius of curvature of the outer circumferential surface of the protrusion 11 may be smaller than the radius of the sheath 10 (the radius of the optical fiber cable 1). According to this configuration, the contact area between the protrusion 11 and the micro-duct (details will be described later) becomes smaller. Therefore, the workability when the optical fiber cable 1 is inserted into the micro-duct can be improved. In one or more embodiments, the "radius of the sheath 10" is the maximum value of the distance between the outer circumferential surface of the protrusion 11 and the central axis O. When the maximum value is different for each protrusion 11, the average value of each maximum value is defined as the "radius of the sheath 10".

Next, a specific example of the optical fiber cable 1 of one or more embodiments will be described. The present invention is not limited to the examples below.

(Maximum Compressive Stress)

Figure 3:
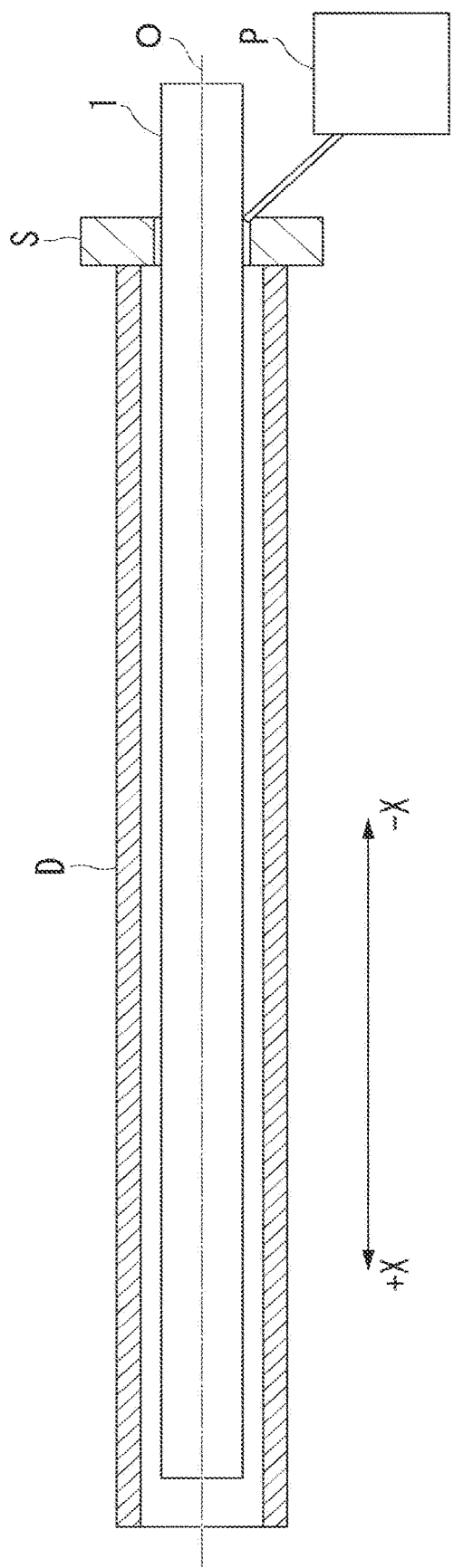
FIG. 3 is a schematic view illustrating a method of air-blowing.

In one or more embodiments, as illustrated in FIG. 3, the workability when the optical fiber cable is inserted into the micro-duct D by air-blow has been examined. The micro-duct D is a pipe installed in advance in the ground or the like. In the air-blowing, a seal S is attached to the end of the micro-duct D, and an optical fiber cable is introduced into the micro-duct D through the opening of the seal S. Further, a pump P is connected to the seal S to allow air to flow from the seal S into the micro-duct D. Thus, an air layer can be formed between the optical fiber cable and the micro-duct D to reduce friction.

Here, when installing the optical fiber cable, the optical fiber cable may be inserted into the micro-duct D over a long distance of, for example, 2000 m or more. When the optical fiber cable is inserted into the micro-duct D over such a long distance, the force needs to be efficiently transmitted from the upstream side (−X side) to the downstream side (+X side) in the longitudinal direction of the optical fiber cable.

As a result of careful examination by the inventors of the present application, it has been found that the compressive strength (maximum compressive stress) of the optical fiber cable may be within a predetermined range, in order to appropriately transmit the force from the upstream side to the downstream side of the optical fiber cable.

Hereinafter, the results of checking the workability of air-blowing by preparing a plurality of optical fiber cables (Test Examples 1-1 to 1-7) having different compressive strengths will be described with reference to Table 1. Test Example 1-8 is a loose tube type optical fiber cable. Details of Test Example 1-8 will be described later.

TABLE 1

|  | Test Example | | | | | | | |
| --- | --- | --- | --- | --- | --- | --- | --- | --- |
|  | 1-1 | 1-2 | 1-3 | 1-4 | 1-5 | 1-6 | 1-7 | 1-8 |
| Diameter d (mm) | 9.2 | 10.5 | 10.0 | 6.1 | 6.3 | 8.0 | 9.4 | 6.5 |
| Cross-sectional area a (mm$^2$) | 66.5 | 86.6 | 78.5 | 29.2 | 31.2 | 50.3 | 69.4 | 33.2 |
| Cross-sectional secondary moment I | 351.7 | 596.7 | 490.9 | 68.0 | 77.3 | 201.1 | 383.2 | 87.6 |
| Cross-sectional secondary radius i | 2.3 | 2.6 | 2.5 | 1.5 | 1.6 | 2.0 | 2.4 | 1.6 |
| Sample length L' (mm) | 11.5 | 13.1 | 12.5 | 7.6 | 7.9 | 10.0 | 11.8 | 8.1 |
| Edge surface support condition and buckling length | 0.5 | 0.5 | 0.5 | 0.5 | 0.5 | 0.5 | 0.5 | 0.5 |
| Slenderness ratio λ | 5 | 5 | 5 | 5 | 5 | 5 | 5 | 5 |
| d/L' | 0.8 | 0.8 | 0.8 | 0.8 | 0.8 | 0.8 | 0.8 | 0.8 |
| Compressive strength (N/mm$^2$) | 11.6 | 9.3 | 12.8 | 19.2 | 19.4 | 16.4 | 14.4 | 32.4 |
| Air-blowing test | NG | NG | OK | OK | OK | OK | OK | OK |

The results of the air-blowing test of optical fiber cables are illustrated in the field of "Air-blowing test" shown in Table 1. More specifically, when each optical fiber cable is air-blown into the micro-duct D and can be blown 2000 m, the result is good (OK), and when 2000 m cannot be blown, the result is not good (NG).

Figure 4:
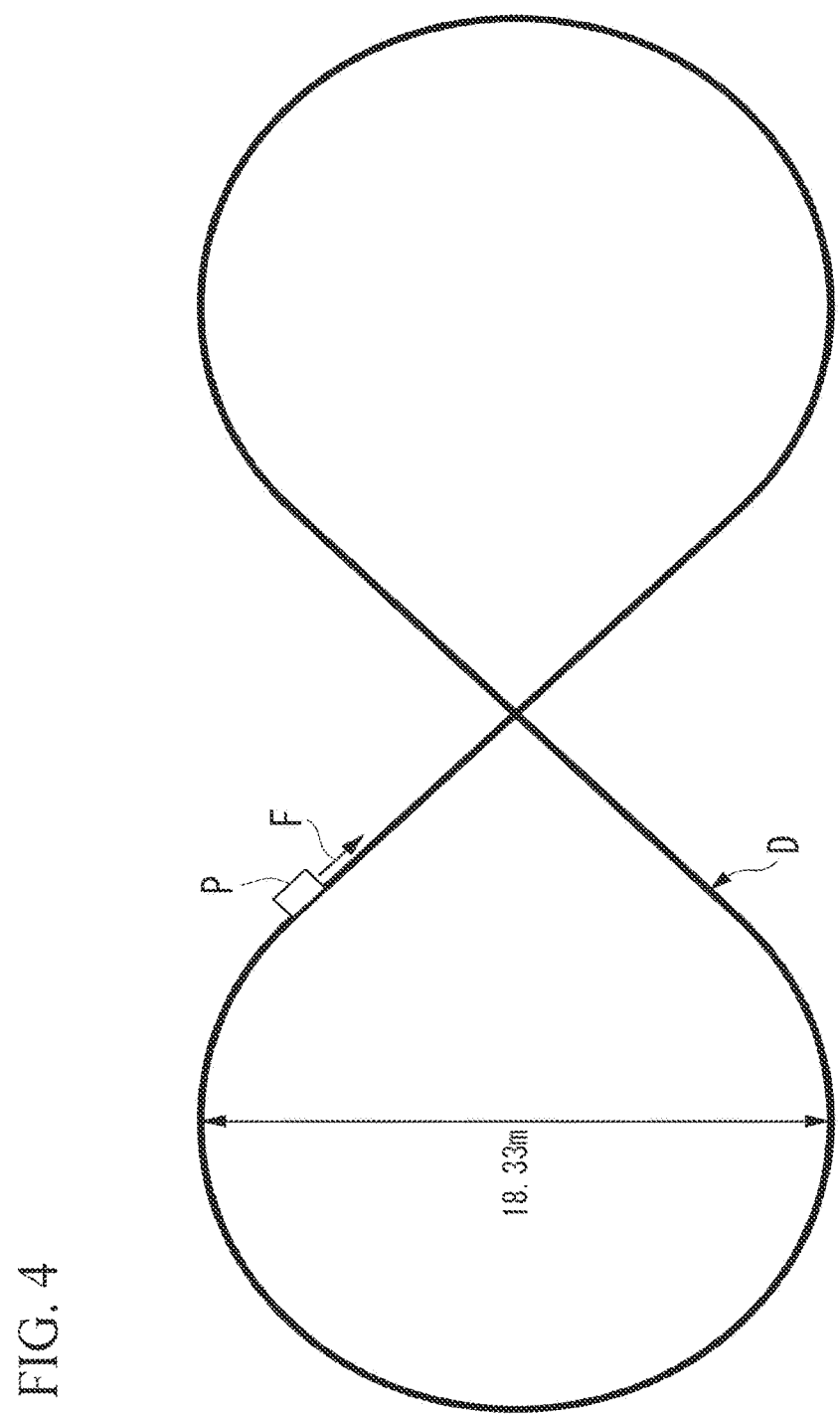
FIG. 4 is a schematic view of a truck used for an air-blowing test.

The micro-duct D used in the air-blowing test is formed into a figure eight shape as illustrated in FIG. 4. The inner width of the curved portion is 18.33 m, and the length of one circumference of the figure eight shape illustrated in FIG. 4 is 125 m. Although not illustrated, a truck having a total length of 2000 m is constructed by making the figure eight shape continuous 16 times. The pump P (see FIG. 3) is disposed in a substantially straight line portion having a figure eight shape, and air-blows the optical fiber cable into the micro-duct D in the direction indicated by the arrow F in FIG. 4.

"Compressive strength" in Table 1 refers to a value obtained by dividing the maximum compressive load (N), which measured by compressing a sample with the length of "Sample length L'(mm)" in Table 1 with a compression tester for each test example, by "Cross-sectional area a (mm$^2$)". The compressive strength is calculated according to JIS K7181: 2011.

More specifically, a general-purpose universal material testing machine is used as the compression tester. Both ends of each sample are fitted into a metal cylinder, which is attached to a compression tester. That is, both ends of the sample are fixedly supported as a boundary condition during the compression test. Each sample is compressed in the longitudinal direction at a rate of 1 mm/min. Then, the compressive load immediately before each sample buckles is measured as the "Maximum compressive load".

The sample length L' of each sample is set such that the value of d/L' is constant (0.8).

As shown in Table 1, in Test Examples (1-1, 1-2) having a compressive strength of 11.6 N/mm$^2$ or less, the air-blowing test results are not good. This is because the compressive strength of the optical fiber cable is not good, and buckling of the optical fiber cable occurs while traveling in the micro-duct D. When the optical fiber cable buckles in the micro-duct D, the force transmitted from the upstream side to the downstream side of the optical fiber cable is converted into a force that presses the optical fiber cable against the inner surface of the micro-duct D at the buckled portion. As a result, it becomes difficult for the force to be transmitted to the downstream end of the optical fiber cable, and the progress of the optical fiber cable is stopped. As a result, it is considered that 2000 m of air-blowing is not possible.

On the other hand, good air-blowing test results can be obtained in Test Examples (1-3 to 1-7) having a compressive strength of 12.8 N/mm$^2$ or more. This is because the compressive strength, that is, the difficulty of deformation with respect to the force in the direction (longitudinal direction) along the central axis O of the optical fiber cable is within a predetermined amount or more, so that buckling of the optical fiber cable in the micro-duct D is suppressed. It is considered that by suppressing the buckling of the optical fiber cable in this way, the force is reliably transmitted to the downstream end of the optical fiber cable, and 2000 m of air-blowing is possible.

From the above results, the compressive strength of the optical fiber cable may be 12.8 N/mm$^2$ or more. With this configuration, buckling of the optical fiber cable in the micro-duct D is suppressed, and the installation workability of the optical fiber cable can be improved.

Further, as shown in Test Example 1-8 of Table 1, the air-blowing test result is also good for the optical fiber cable having a compressive strength of 32.4 N/mm$^2$. Therefore, it is considered that good air-blowing test results can be obtained by setting the compressive strength to 32.4 N/mm$^2$ or less.

From the above, the compressive strength of the optical fiber cable may be 12.8 N/mm$^2$ or more and 32.4 N/mm$^2$ or less.

(Wrap Rate)

Figure 5:
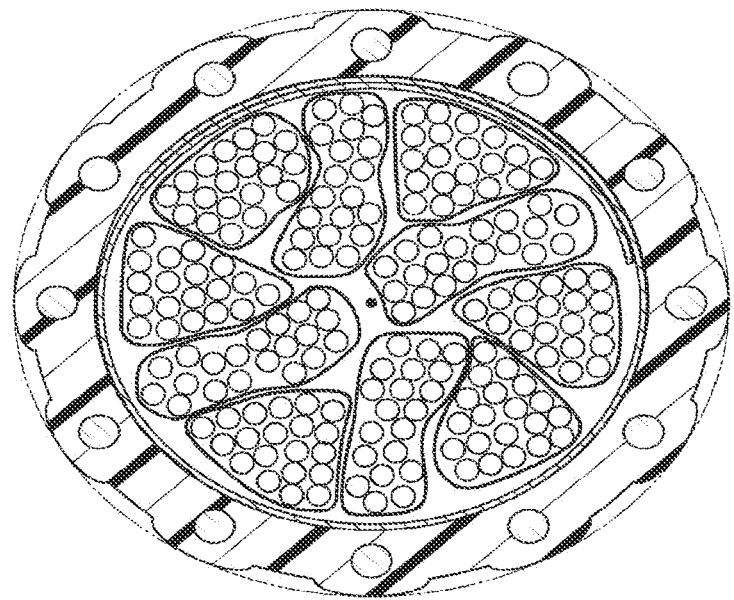
FIG. 5 is a transverse cross-sectional view of a deformed optical fiber cable.

As illustrated in FIG. 1A, a wrap portion 22a is formed on the wrapping tube 22 of one or more embodiments. As a result of examination by the inventors of the present application, it is found that when the ratio of the circumference length of the wrap portion 22a to the total circumference length of the wrapping tube 22 is large, the optical fiber cable is likely to be deformed into a substantially elliptical shape as illustrated in FIG. 5. More specifically, it tends to have an elliptical shape such that the direction in which the wrap portion 22a extends has a major axis of the elliptical shape. When such deformation occurs, the sealability at the opening (see FIG. 3) of the scaling portion S may decrease. Further, the protrusion 11 positioned on the major axis in the elliptical shape may be strongly pressed against the inner circumferential surface of the micro-duct D to increase the friction.

That is, it has been found that the ratio of the wrap portion 22a to the total circumference length of the wrapping tube 22 affects the workability when air-blowing the optical fiber cable.

Therefore, the result of examining the ratio of the wrap portion 22a will be described below.

As illustrated in FIG. 1A, the circumference length of the wrap portion 22a in the transverse cross-sectional view is W1. Further, the circumference length of the non-wrap portion 22b is W2 (not illustrated). At this time, the wrap rate R is defined by the following Equation (1).

$$R = W1 \div (W1 + W2) \times 100 \qquad (1)$$

The wrap rate R indicates the ratio of the circumference length of the wrap portion 22a to the total circumference length of the wrapping tube 22.

In the present example, as shown in Table 2, a plurality of optical fiber cables (Test Examples 2-1 to 2-6) having different wrap rates R are prepared.

The measurement result of the transmission loss of each optical fiber cable is shown in the field of "Transmission loss" in Table 2. More specifically, at a wavelength of 1550 nm, the result is good (OK) when the transmission loss is 0.30 dB/km or less, and the result is not good (NG) when the transmission loss is greater than 0.30 dB/km.

The significance of the field of "Air-blowing test" in Table 2 is the same as in Table 1.

TABLE 2

|  | Test Example | | | | | |
| --- | --- | --- | --- | --- | --- | --- |
|  | 2-1 | 2-2 | 2-3 | 2-4 | 2-5 | 2-6 |
| wrap rate R | 27% | 20% | 13% | 9% | 5% | 3% |
| Transmission loss | OK | OK | OK | OK | OK | NG |
| Air-blowing test | NG | OK | OK | OK | OK | OK |

As shown in Table 2, in Test Examples (2-1 to 2-5) having a wrap rate R of 5% or more, the transmission loss results are good. On the other hand, in Test Example (2-6) having a wrap rate R of 3%, the result of transmission loss is not good. It is considered that this is because when the wrap rate R is significantly small, the optical fiber protrudes from the wrap portion 22a to the outside of the wrapping tube 22, local bending is applied to the optical fiber, and the transmission loss increases.

Further, in Test Examples (2-2 to 2-6) having a wrap rate R of 20% or less, the results of the air-blowing test are good. On the other hand, in Test Example (2-1) having a wrap rate R of 27%, the result of the air-blowing test is not good. The reason for this is that the wrap rate R is significantly large, and as described above, the optical fiber cable is deformed into an elliptical shape, so that the workability during air-blowing has decreased.

From the above results, the wrap rate R may be 5% or more and 20% or less. With this configuration, it is possible to improve the workability of air-blowing while suppressing an increase in transmission loss due to local bending of the optical fiber.

(Cross-Sectional Area of Recesses)

When the optical fiber cable is inserted into the micro-duct D by air-blowing, at least a part of the air flows through the recess 12 as a flow path. Then, a part of the air flowing through the recess 12 flows between the protrusion 11 and the micro-duct D, and an air layer is formed therebetween to reduce the friction. Here, as a result of examination by the inventors of the present application, it has been found that in order for the above air layer to be properly formed, the cross-sectional area of the recesses 12 functioning as an air flow path may be within a predetermined range. The results of the examination will be described below.

Figure 6:
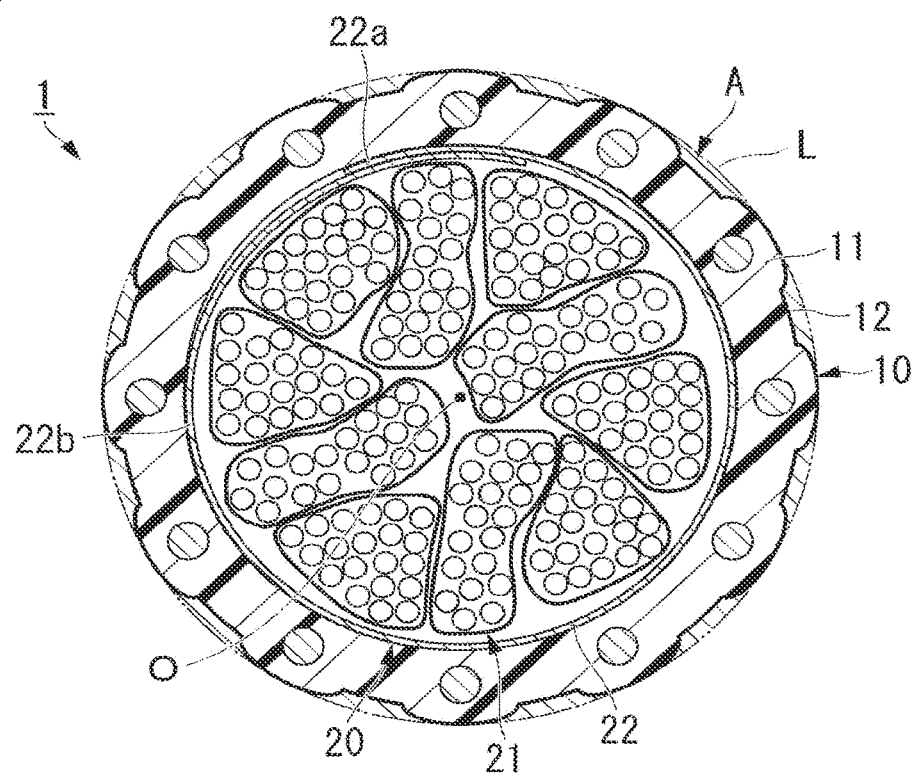
FIG. 6 is an explanatory view of a cross-sectional area of a recess.

In the present example, a plurality of optical fiber cables (Test Examples 3-1 to 3-6) having different cross-sectional areas A of the recesses illustrated in FIG. 6 are prepared. The cross-sectional area A of the recesses is the cross-sectional area of the space defined by the closed curve L and all the recesses 12 when the closed curve L in contact with the radial outer end of each protrusion 11 is drawn, in the transverse cross-sectional view. In other words, the cross-sectional area A of the recesses is the difference in the cross-sectional area of the optical fiber cable of the present example with respect to the cross-sectional area of the virtual optical fiber cable having the closed curve L as the outer circumferential surface.

The closed curve L is usually circular with the central axis O as the center. However, due to the deformation of the optical fiber cable, the closed curve L may have an elliptical shape.

TABLE 3

|  | Test Example | | | | | |
|---|---|---|---|---|---|---|
|  | 3-1 | 3-2 | 3-3 | 3-4 | 3-5 | 3-6 |
| Cross-sectional area A of recesses (mm$^2$) | 5.2 | 4.8 | 3.4 | 2.8 | 1.3 | 0.0 |
| Air-blowing test | NG | OK | OK | OK | OK | NG |

As shown in Table 3, the results of the air-blowing test are not good, in Test Example (3-1) having a cross-sectional area A of the recesses of 5.2 mm$^2$. The reason for this is that when the cross-sectional area A of the recesses is significantly large, the sealability between the seal S and the optical fiber cable is deteriorated, and the backflow of air from the inside of the micro-duct D is likely to occur. When the amount of air flowing back from the inside of the micro-duct D is large, the amount of air intervening between the inner surface of the micro-duct D and the optical fiber cable is reduced, and friction increases. It is considered that this friction made it difficult for the force to be transmitted from the upstream side to the downstream side of the optical fiber cable, and the progress of the optical fiber cable stopped.

In contrast, in Test Examples (3-2 to 3-5) in which the cross-sectional area A of the recesses is 1.3 mm$^2$ or more and 4.8 mm$^2$ or less, the results of the air-blowing test is good. This is because the cross-sectional area A of the recesses is sufficiently small, the sealability between the seal S and the optical fiber cable is good, and the backflow of air from the inside of the micro-duct D is suppressed. That is, it is considered that the friction is reduced by the sufficient air intervening between the inner surface of the micro-duct D and the optical fiber cable, and the force can be transmitted from the upstream side to the downstream side of the optical fiber cable.

Further, in Test Example 3-6, since the sheath 10 is not formed with an uneven shape, the friction between the inner surface of the micro-duct D and the optical fiber cable is large, and the progress of the optical fiber cable is stopped.

From the above results, the cross-sectional area A of the recesses may be in the range of 1.3 mm$^2$ or more and 4.8 mm$^2$ or less. With this configuration, the sealability between the seal S and the optical fiber cable can be ensured, and the workability of air-blowing can be improved.

(Twisted Shape of Sheath)

The recess 12 serves as an air flow path when the optical fiber cable is air-blown. Here, for example, when the recesses 12 extend linearly along the longitudinal direction (see FIG. 7A) and when the recesses 12 are spirally twisted along the longitudinal direction (see FIG. 7B), the air flow state changes. It is considered that the difference in the air flow state affects the workability when the optical fiber cable is air-blown.

Therefore, the results of examining the relationship between the twisted shape of the sheath 10 and the workability of air-blowing will be described with reference to Table 4. Here, a plurality of optical fiber cables (Test Examples 4-1 to 4-5) having different twist angles θ are prepared. The twist angle θ is the amount of twist around the central axis O of the sheath 10 (protrusion 11) per 1 in in the longitudinal direction. For example, when θ=90 (°/m), it means that the positions of the protrusions 11 differ by 90° around the central axis O when comparing the portions separated by 1 m along the longitudinal direction in the cable. In Test Examples 4-2 to 4-5, the tensile strength members 30 are twisted around the central axis O at a twist angle θ similar to that of the protrusions 11. Therefore, the optical fiber cables of Test Examples 4-2 to 4-5 have substantially the same transverse cross-sectional shape at any position in the longitudinal direction.

TABLE 4

| Test Example | 4-1 | 4-2 | 4-3 | 4-4 | 4-5 |
|---|---|---|---|---|---|
| Twist angle θ (°/m) | 0 | 5 | 10 | 120 | 180 |
| Air-blowing test | NG | NG | OK | OK | OK |

As shown in Table 4, in Test Examples (4-3 to 4-5) in which the twist angle is 10≤θ(°/m)≤180, results of the air-blowing test are good. It is considered that this is because the pressure of the air flowing in the recesses 12 can be effectively converted into the thrust that propels the optical fiber cable to the downstream side. That is, the air flowing in the recesses 12 exerts a pressure in the direction perpendicular to the side surface of the protrusion 11. Therefore, the larger the value of θ, the more the side surface of the protrusion 11 is inclined with respect to the longitudinal direction, and the pressure of air is converted into the force in the longitudinal direction.

On the other hand, in Test Examples (4-1, 4-2) in which the twist angle θ is 5°/m or less, the results of the air-blowing test are not good. It is considered that this is because the pressure of the air flowing in the recesses 12 cannot be effectively used for the thrust of the optical fiber cable.

From the above, the twist angle of the sheath 10 may be 10≤θ(°/m)≤180. With this configuration, the pressure of the air flowing in the recesses 12 can be effectively converted into a force for propelling the optical fiber cable to the downstream side, and the workability of air-blowing can be improved.

When molding the sheath 10 such that 10≤θ (°/m)≤180, a twisted shape may be positively provided on the sheath 10. Alternatively, the sheath 10 may be twisted by utilizing the force that the optical fiber unit 21 twisted in a spiral shape tries to untwist.

Figure 7B:
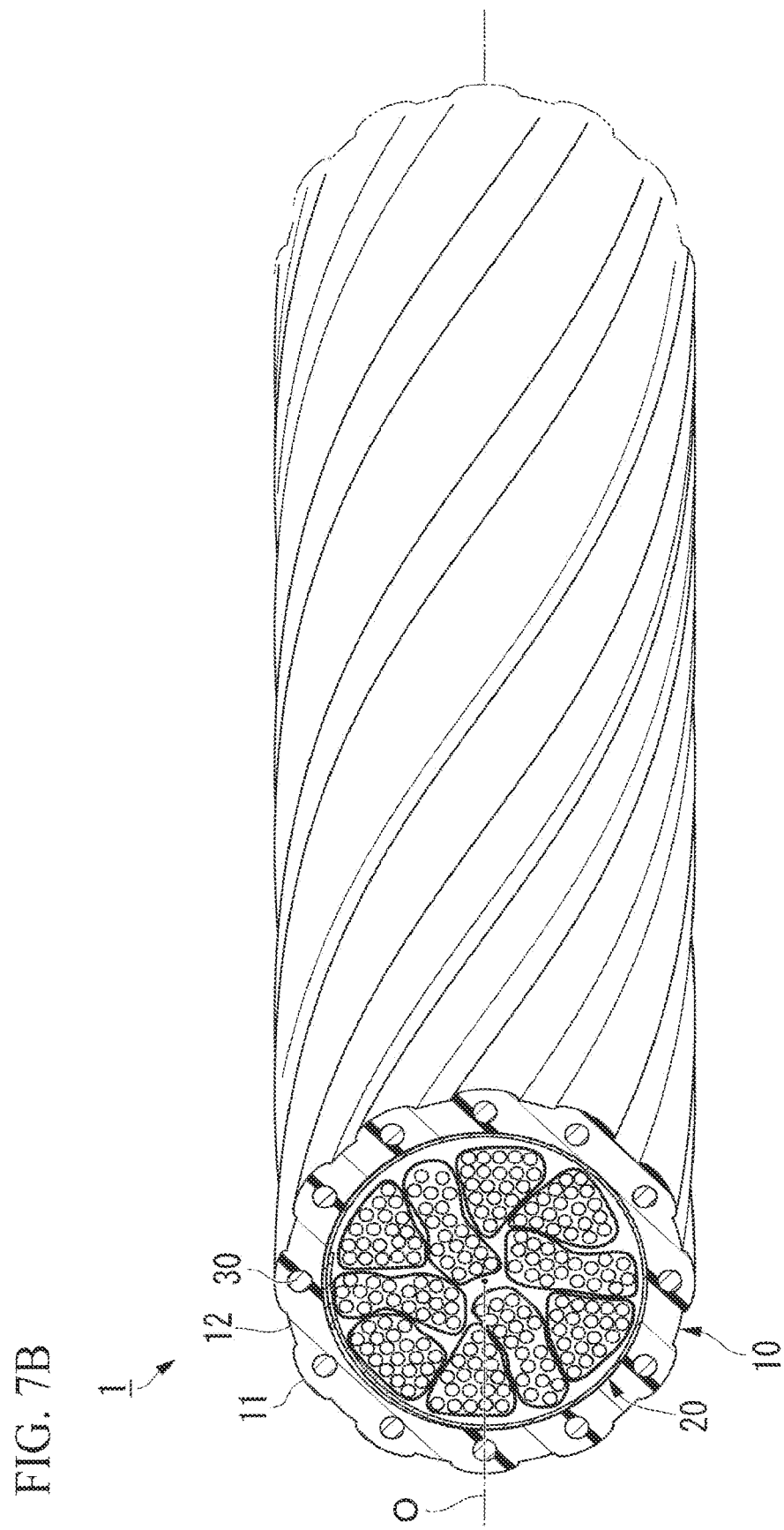
FIG. 7B is a diagram illustrating a case where the protrusion and the tensile strength member are twisted in a spiral shape.

Next, the result of examining the influence of the twisted shape of the sheath 10 and the tensile strength members 30 on the flexural rigidity of the optical fiber cable will be described. In the present example, two optical fiber cables of Test Examples 5-1 and 5-2 (see FIG. 8) are prepared. The optical fiber cable of Test Example 5-1 is an optical fiber cable similar to that of Test Example 4-1. As illustrated in FIG. 7A, the sheath 10 and the tensile strength members 30 are not twisted. In the optical fiber cable of Test Example 5-2, the sheath 10 and the tensile strength members 30 are twisted in a spiral shape as illustrated in FIG. 7B, and the pitch in the longitudinal direction is 700 mm. In both Test Examples 5-1 and 5-2, a core 20 in which a plurality of optical fiber units 21 are twisted in an SZ shape is adopted.

Figure 8:
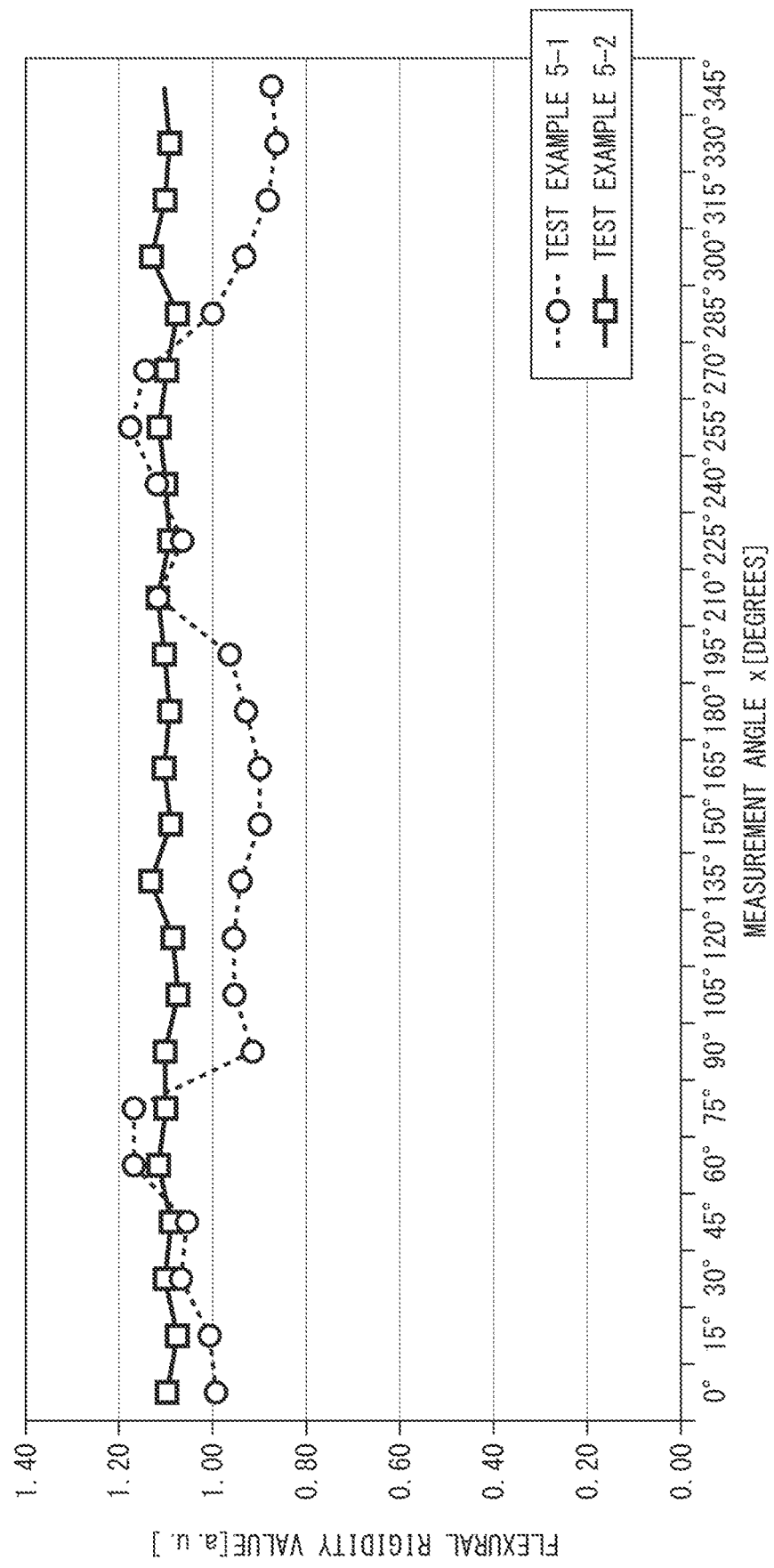
FIG. 8 is a graph illustrating the effect of the spiral twist of the protrusion and the tensile strength member on the flexural rigidity of the optical fiber cable.

As illustrated in FIG. 8, the optical fiber cable of Test Example 5-1 has a large variation in the flexural rigidity value for each measurement angle X. On the other hand, in the optical fiber cable of Test Example 5-2, the variation in the flexural rigidity value for each measurement angle X is smaller than that of Test Example 5-1. This difference is due to whether or not the tensile strength members 30 are twisted in a spiral shape and disposed. In Test Example 5-2, since the tensile strength members 30 are disposed in a spiral shape, it is considered that the flexural rigidity is made uniform in the circumferential direction.

As described above, the tensile strength members 30 are embedded inside the protrusions 11 of the sheath 10, and the protrusions 11 and the tensile strength members 30 are formed into a spirally twisted shape centered on the central axis O, so that the flexural rigidity of the optical fiber cable can be made uniform in the circumferential direction. This makes it possible to provide an optical fiber cable that is easier to handle and easier to install in a micro-duct.

(Material of Tensile Strength Member)

Next, the results of examining the material of the tensile strength member 30 will be described with reference to Tables 5 and 6. Test Examples 6-1 to 6-3 shown in Table 5 are optical fiber cables having 288 optical fibers. Test Examples 7-1 and 7-2 shown in Table 6 are optical fiber cables having 144 optical fibers.

TABLE 5

|  | TM material | Tensile elastic modulus (kg/mm$^2$) | TM diameter (mm) | TM cross-sectional area (mm$^2$) | Number of TMs (pieces) | Tensile strength index | Outer diameter ratio |
| --- | --- | --- | --- | --- | --- | --- | --- |
| Test Example 6-1 | KFRP | 5000 | 0.5 | 0.196 | 12 | 1.00 | 1.00 |
| Test Example 6-2 | PBO-FRP | 25000 | 0.25 | 0.049 | 12 | 1.25 | 0.94 |
| Test Example 6-3 | PBO-FRP | 25000 | 0.3 | 0.071 | 8 | 1.20 | 0.95 |

TABLE 6

|  | TM material | Tensile elastic modulus (kg/mm$^2$) | TM diameter (mm) | TM cross-sectional area (mm$^2$) | Number of TMs (pieces) | Tensile strength index | Outer diameter ratio |
| --- | --- | --- | --- | --- | --- | --- | --- |
| Test Example 7-1 | KFRP | 5000 | 0.5 | 0.196 | 10 | 1.00 | 1.00 |
| Test Example 7-2 | PBO-FRP | 25000 | 0.25 | 0.049 | 10 | 1.25 | 0.92 |

In both Test Examples 5-1 and 5-2, the number of protrusions 11 and tensile strength members 30 is 12.

Figure 9:
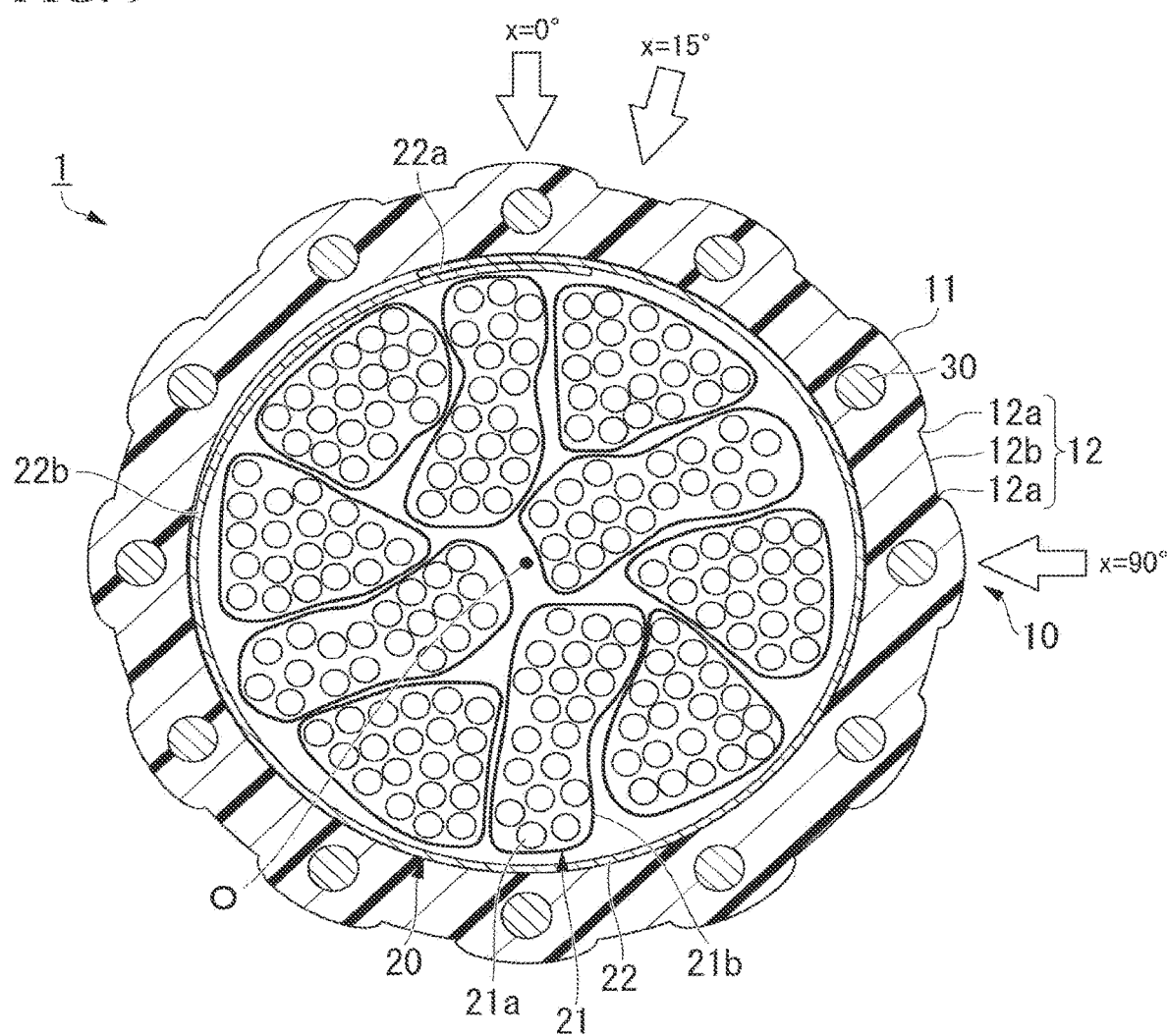
FIG. 9 is a diagram illustrating a measurement angle X, which is the horizontal axis of FIG. 8.

FIG. 8 is a graph illustrating the flexural rigidity values for each measurement angle X, for the optical fiber cables of Test Examples 5-1 and 5-2. As illustrated in FIG. 9, the measurement angle X indicates an angle at which a force is applied when measuring the flexural rigidity. In the present example, since a force is applied to each of the central portions of the 12 protrusions 11 and the 12 recesses 12, the measurement angle X is in increments of 15°(=360°÷24).

In Tables 5 and 6, "TM material", "Tensile elastic modulus", "TM diameter", and "TM cross-sectional area" indicate the material, tensile elastic modulus, diameter, and cross-sectional area of the tensile strength member 30, respectively. "Number of TMs" indicates the number of tensile strength members 30 included in the test example. The surface of the sheath 10 in each test example is provided with the same number of protrusions 11 as the tensile strength members 30, and the tensile strength member 30 is disposed inside each protrusion 11.

The "Tensile strength index" shown in Table 5 indicates the ratio of the tensile force, when the tensile force in the longitudinal direction is applied to the optical fiber cables of Test Examples 6-1 to 6-3 to reach a predetermined elongation rate α(%), based on Test Example 6-1. For example, since Test Example 6-2 has a tensile strength index of 1.25, a tensile force which is 1.25 times greater than the tensile force of Test Example 6-1 is required before the elongation rate reaches α. The tensile strength index shown in Table 6 is also the same as the tensile strength index in Table 5 except that the tensile force of Test Example 7-1 is used as a reference.

The elongation rate α is set in a range in which the optical fiber cable elongates in proportion to the tensile force. Therefore, the tensile strength index of Test Examples 6-2, 6-3, and 7-2 is not affected by the value of the elongation rate α.

The "Outer diameter ratio" shown in Table 5 represents the size of the outer diameter of the optical fiber cables of Test Examples 6-2 and 6-3 with respect to the outer diameter of the optical fiber cable of Test Example 6-1. For example, the outer diameter of the optical fiber cable of Test Example 6-2 is 0.94 times the outer diameter of the optical fiber cable of Test Example 6-1. The same applies to the "Outer diameter ratio" in Table 6, which represents the size of the outer diameter of the optical fiber cables of Test Example 7-2 with respect to the outer diameter of the optical fiber cable of Test Example 7-1. Since the sheath 10 of each test example is designed to have the same minimum thickness, the smaller the diameter of the tensile strength member 30, the smaller the outer diameter ratio.

As shown in Table 5, the tensile strength indices of Test Examples 6-2 and 6-3 are 1.25 and 1.20, respectively, which are more difficult to elongate in the longitudinal direction than Test Example 6-1 and effectively protect the optical fiber from tension. Further, the TM diameters of Test Examples 6-2 and 6-3 are 0.25 mm and 0.30 mm, respectively, which are significantly smaller than the TM diameter of Test Example 6-1. Thus, the outer diameter of the optical fiber cables of Test Examples 6-2 and 6-3 is smaller than that of Test Example 6-1.

As shown in Table 6, the same results as in Table 5 are also obtained in Test Examples 7-1 and 7-2 having 144 optical fibers.

As described above, by using PBO-FRP having a large tensile elastic modulus as the material of the tensile strength member 30, it is possible to provide an optical fiber cable that is difficult to elongate with respect to tension in the longitudinal direction and has a small outer diameter.

(Number of Tensile Strength Members for Protrusions)

Figure 10:
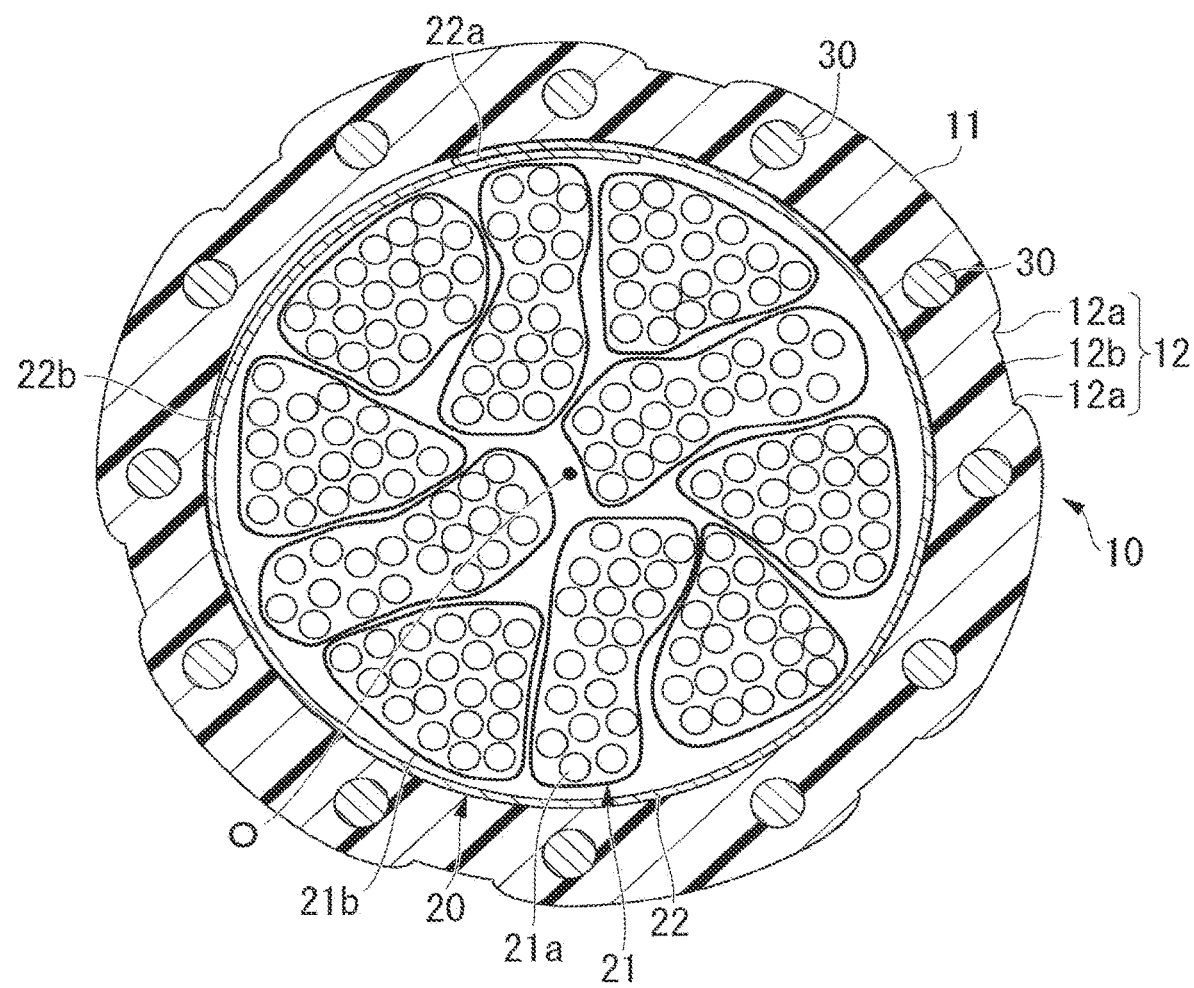
FIG. 10 is a transverse cross-sectional view of an optical fiber cable in which a plurality of tensile strength members are disposed inside one protrusion.

The number of tensile strength members 30 disposed inside the protrusions 11 can be appropriately changed. For example, an optical fiber cable having a transverse cross-sectional shape as illustrated in FIG. 10 may be adopted. In the optical fiber cable illustrated in FIG. 10, two tensile strength members 30 are embedded inside one protrusion 11, in a transverse cross-sectional view. In this way, two or more tensile strength members 30 may be disposed inside one protrusion 11.

(Set Twist Angle)

Next, the effect of twisting the plurality of optical fiber units 21 in an SZ shape will be described with reference to Table 7.

TABLE 7

| | Set angle (°) | Twist angle of sheath (°) | Air-blowing test | Transmission loss | Determination |
|---|---|---|---|---|---|
| Test Example 9-1 | 0 | 0 | 1500 m | NG | NG |
| Test Example 9-2 | ±350 | ±30 | 2000 m or more | OK | OK |
| Test Example 9-3 | ±500 | ±50 | 2000 m or more | OK | OK |
| Test Example 9-4 | ±700 | ±70 | 2000 m or more | OK | OK |

The optical fiber cables of Test Examples 9-1 to 9-4 have a transverse cross-sectional shape as illustrated in FIG. 1A. The number of protrusions 11 and tensile strength members 30 is 12. An intermittently-adhered optical fiber ribbon is used as the optical fiber unit 21. The "Set angle" in Table 7 indicates a set angle when the plurality of optical fiber units 21 are twisted in an SZ shape. For example, in a case where the set angle is ±350°, when the core 20 is housed in the sheath 10, an operation of rotating the bundle of the optical fiber units 21 by 350° in the CW direction and then rotating the bundle by 350° in the CCW direction is repeatedly performed. Thus, the bundle of the optical fiber units 21 is housed in the sheath 10 in a state of being twisted in an SZ shape.

When the bundle of the optical fiber units 21 is twisted in an SZ shape, the bundle of the optical fiber units 21 tries to untwist back to the shape before being twisted. By wrapping the bundle of the optical fiber units 21 with the wrapping tube 22 and the sheath 10 before the untwisting occurs, the state in which the bundle of the optical fiber units 21 is twisted in an SZ shape inside the optical fiber cable is maintained.

Here, inside the optical fiber cable, the sheath 10 receives the force that the optical fiber unit 21 tries to untwist, through the wrapping tube 22. Since the sheath 10 is deformed by this force, an SZ-shaped twist also appears on the surface of the sheath 10. In this case, the tensile strength members 30 embedded in the sheath 10 are also twisted in an SZ shape. The SZ-shaped twist angle that appears on the surface of the sheath 10 in this way is shown in "Twist angle of sheath" in Table 7. In the optical fiber cable of Test Example 9-1, since the optical fiber unit 21 is not twisted in an SZ shape, no SZ-shaped twist appears on the surface of the sheath 10. On the other hand, in the optical fiber cables of Test Examples 9-2 to 9-4, since the optical fiber unit 21 is twisted in an SZ shape, an SZ-shaped twist appears on the surface of the sheath 10.

The larger the set angle, the greater the force that the optical fiber unit 21 tries to untwist. Therefore, as shown in Table 7, the larger the set angle, the larger the "Twist angle of sheath".

In the field of "Air-blowing test" shown in Table 7, the results of the air-blowing test performed on the optical fiber cables of Test Examples 9-1 to 9-4 are shown. The details of the air-blowing test are the same as those in Table 1. For example, in Test Example 9-1, it is possible to blow 1500 m in the air-blowing test, but it is difficult to blow more than that. On the other hand, in Test Examples 9-2 to 9-4, air-blowing of 2000 m or more is possible in the air-blowing test. The details of "Transmission loss" in Table 7 are the same as those in Table 2.

As shown in Table 7, with respect to the optical fiber units of Test Examples 9-2 to 9-4, better results are obtained than Test Example 9-1 in the air-blowing test. This is because the protrusions 11 and the recesses 12 are twisted in an SZ shape, so that the pressure of the air flowing in the recesses 12 can be effectively converted into the thrust that propels the optical fiber cable to the downstream side. That is, the air flowing in the recesses 12 exerts a pressure in the direction perpendicular to the side surface of the protrusion 11. Therefore, it is considered that the air pressure is converted into the force in the longitudinal direction and the result of the air-blowing test is improved as compared with Test Example 9-1 in which the sheath 10 is not twisted. Further, in Test Examples 9-2 to 9-4, when SZ-shaped twist is applied to the sheath 10, the tensile strength members 30 embedded in the sheath 10 are also twisted in an SZ shape, and the flexural rigidity of the optical fiber cable is homogenized in the circumferential direction. This point is also considered to have been a factor in improving the results of the air-blowing test.

Figure 11:
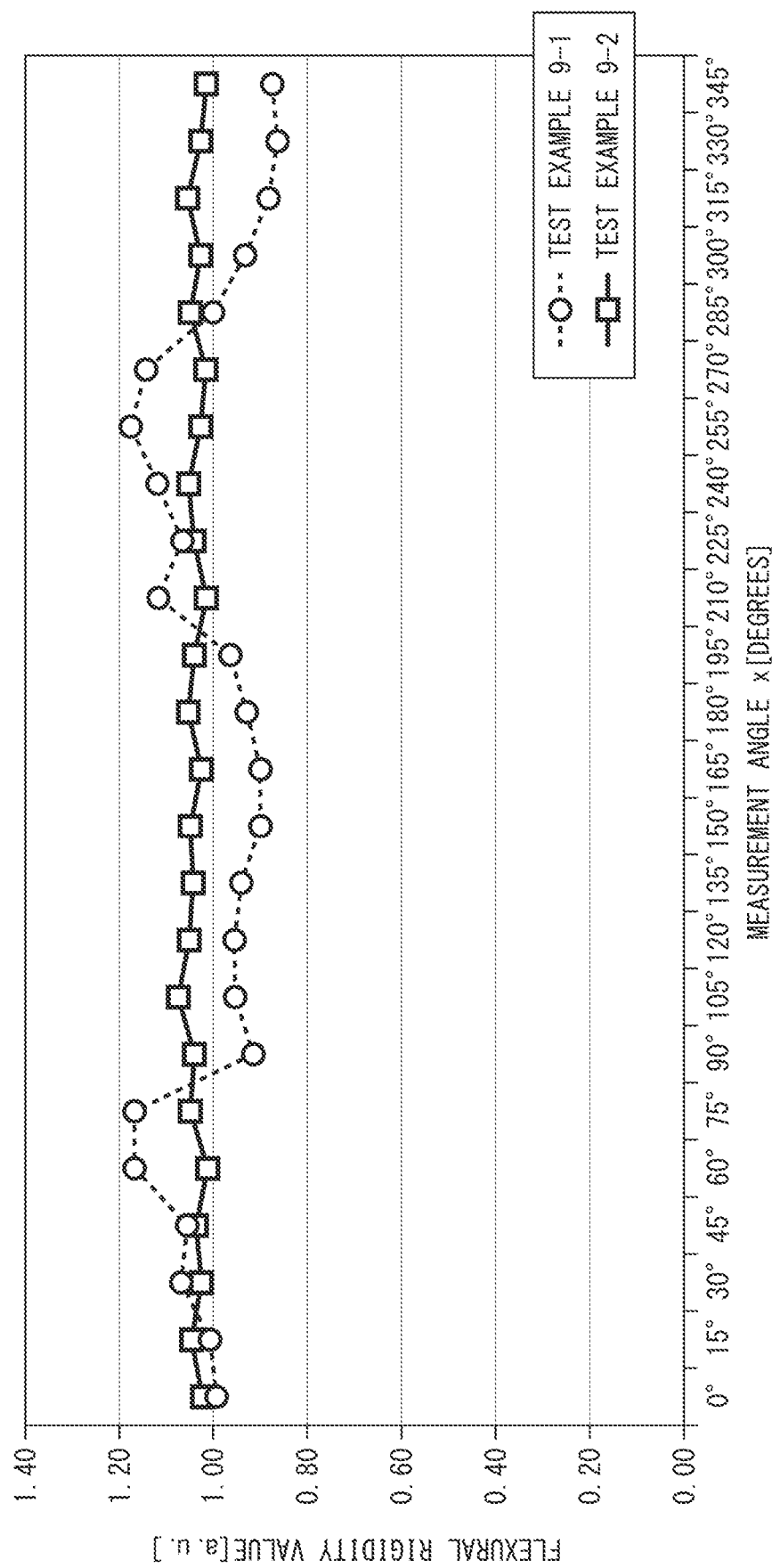
FIG. 11 is a graph illustrating the effect of the SZ-shaped twist of the protrusion and the tensile strength member on the flexural rigidity of the optical fiber cable.

The flexural rigidity values of the optical fiber cables of Test Examples 9-1 and 9-2 for each measurement angle X are illustrated in FIG. 11. The method for measuring the flexural rigidity value is the same as in Test Examples 5-1 and 5-2. From FIG. 11, it can be seen that the optical fiber cable of Test Example 9-2 has a smaller variation in the flexural rigidity value for each measurement angle X than the optical fiber cable of Test Example 9-1.

From the above, by twisting a plurality of optical fiber units 21 in an SZ shape, and applying an SZ-shaped twist to the sheath 10 by the force of untwisting, it is possible to provide an optical fiber cable in which flexural rigidity is made uniform in the circumferential direction and is good for air-blowing. In the present example, the optical fiber unit 21 is twisted in an SZ shape. However, it is considered that the same result can be obtained when a plurality of optical fibers 21a are twisted in an SZ shape without being unitized. That is, by twisting the plurality of optical fibers 21a in an SZ shape, the above-described action and effect can be obtained when an SZ-shaped twist is applied to the sheath 10.

Further, as shown in Table 7, it has been found that in Test Examples 9-2, 9-3, and 9-4, in addition to the air-blowing test, the transmission loss is also good. Therefore, by setting the SZ twist angle of the optical fiber unit 21 such that the twist angle of the sheath 10 is ±30° to ±70°, it is possible to provide an optical fiber cable having good transmission loss characteristics.

(Low Friction Material)

Since the sheath 10 comes into contact with the micro-duct D (see FIG. 3) when the optical fiber cable is air-blown, the sheath 10 may be made of a material having a low friction coefficient (hereinafter referred to as a low friction material). On the other hand, when the entire sheath 10 is made of a low friction material, it is considered that the strength of the sheath 10 cannot be ensured or the cost increases. Therefore, an examination is performed in which a portion of the sheath 10 in contact with the micro-duct is formed of a low friction material. Hereinafter, a description will be made with reference to Table 8.

TABLE 8

Figure 12A:
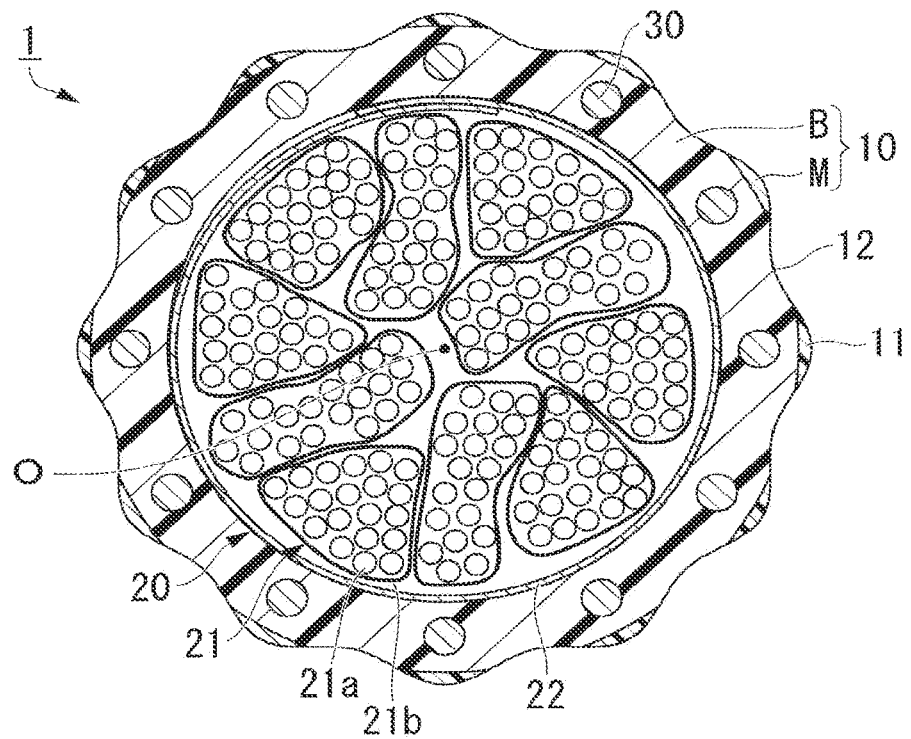
FIG. 12A is a transverse cross-sectional view of an optical fiber cable in which a low friction material is disposed on the top of a protrusion.
Figure 12B:
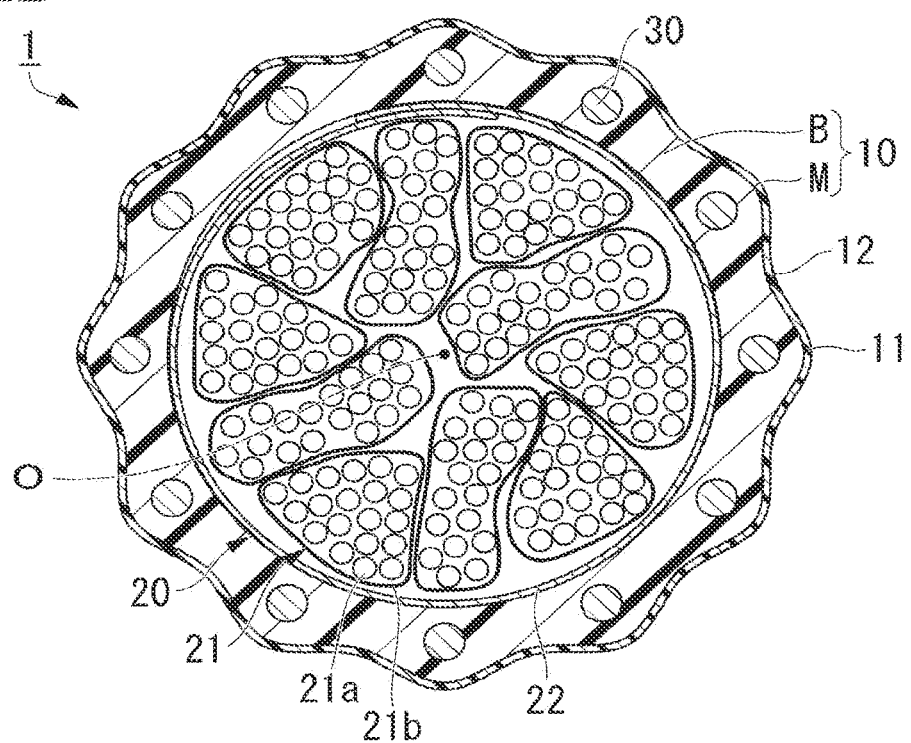
FIG. 12B is a transverse cross-sectional view of an optical fiber cable in which a layer of a low friction material is disposed on the entire surface of the sheath.
Figure 12C:
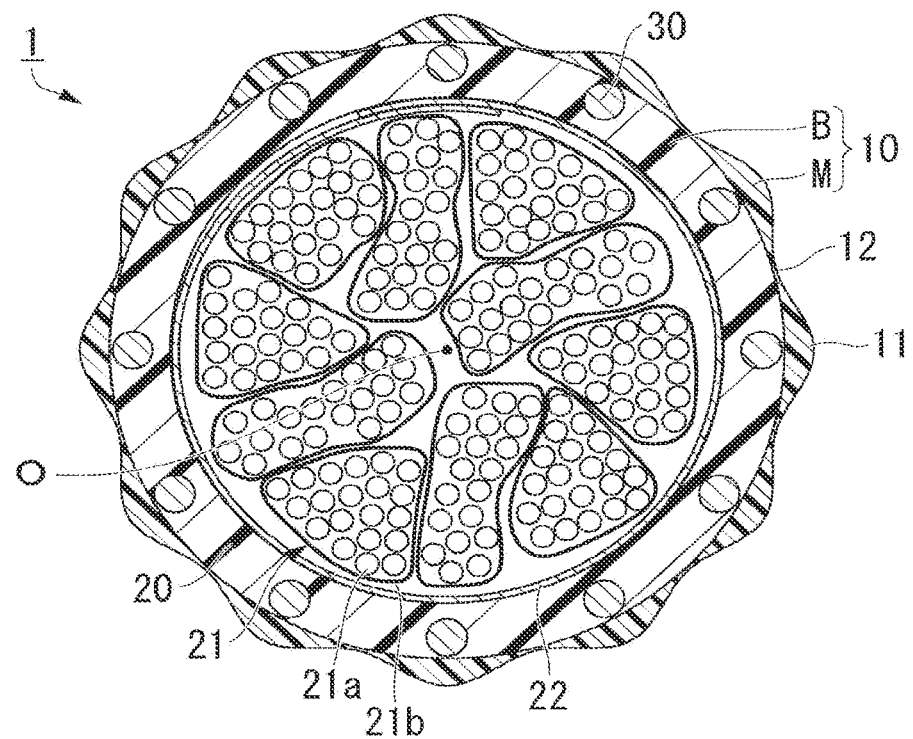
FIG. 12C is a transverse cross-sectional view of an optical fiber cable having a protrusion formed of a low friction material.

| | Transverse cross-sectional shape | Cable outer diameter | Air-blowing test result |
|---|---|---|---|
| Test Example 10-1 | FIG. 1A | 12 mm | 2000 m |
| Test Example 10-2 | FIG. 1A | 8 mm | 2000 m or more |
| Test Example 10-3 | FIG. 12A | 12 mm | 2000 m or more |
| Test Example 10-4 | FIG. 12A | 8 mm | 2000 m or more |
| Test Example 10-5 | FIG. 12B | 12 mm | 2000 m or more |
| Test Example 10-6 | FIG. 12B | 8 mm | 2000 m or more |
| Test Example 10-7 | FIG. 12C | 12 mm | 2000 m or more |
| Test Example 10-8 | FIG. 12C | 8 mm | 2000 m or more |

As shown in Table 8, the optical fiber cables of Test Examples 10-1 to 10-8 are prepared. In the optical fiber cables of Test Examples 10-1 and 10-2, the sheath 10 is formed of a single base material B (average dynamic friction coefficient: 0.27). In the optical fiber cables of Test Examples 10-3 and 10-4, as illustrated in FIG. 12A, the top of the protrusion 11 is formed of a low friction material M (average dynamic friction coefficient is 0.20), and the rest part of the sheath 10 is formed of the base material B. That is, the low friction material M is a material having a smaller friction coefficient than the base material B. The average dynamic friction coefficient is measured according to JIS K7125.

In the optical fiber cables of Test Examples 10-5 and 10-6, as illustrated in FIG. 12B, a layer of the low friction material M is provided on the entire surface of the sheath 10 formed of the base material B. In the optical fiber cables of Test Examples 10-7 and 10-8, as illustrated in FIG. 12C, the protrusions 11 and the recesses 12 are formed of the low friction material M on the outer circumferential surface of the cylindrical base material B.

The optical fiber cables of Test Examples 10-3 to 10-8 are common in that the sheath 10 is formed of the base material B and the low friction material M, and the low friction material M is disposed at least on the top of the protrusion 11. In the present specification, the "top" of the protrusion 11 refers to a portion curved so as to be convex radially outward.

An air-blowing test is performed on the optical fiber cables of Test Examples 10-1 to 10-8. The speed of blowing the optical fiber cable (blowing speed) is about 60 m/min at the start of the test. In all of Test Examples 10-1 to 10-8, the blowing speed decreases as the blowing distance increases. In Test Example 10-1, the blowing speed is almost zero when the blowing distance is 2000 m. On the other hand, in Test Examples 10-2 to 10-8, it is confirmed that the blowing speed is 30 m/min or more when the blowing distance is 2000 m, and that blowing of 2000 m or more is sufficiently possible. As described above, in the optical fiber cables of Test Examples 10-2 to 10-8, better results are obtained than the results of Test Example 10-1. Since Test Examples 10-2 and 10-1 have the same transverse cross-sectional shape, but Test Example 10-1 has a large outer diameter and a large contact area with a micro-duct, it is considered that friction increases and the air-blowing property is lower than that of Test Example 10-2. On the other hand, in Test Examples 10-3, 10-5, and 10-7, the friction is reduced by forming the portion in contact with the micro-duct with the low friction material M, and the air-blowing property can be improved even in the optical fiber cable having an outer diameter of 12 mm or more.

As described above, since the low friction material M is disposed at least on the top of the protrusion 11, it is possible to provide an optical fiber cable having good air-blowing property. Further, by forming the sheath 10 with the base material B and the low friction material M, it is possible to improve the strength of the sheath 10 and reduce the cost, as compared with the case where the entire sheath 10 is formed of the low friction material M.

However, in consideration of the air-blowing property and cost required for the optical fiber cable 1, the entire sheath 10 may be formed of the low friction material M.

(Ripcord)

In the optical fiber cable connection work and disassembly work, it is necessary to take out the core 20 from the inside of the sheath 10. The structures of FIGS. 13A to 13C are proposed as the arrangement of the ripcord for facilitating the operation of accessing to the core 20.

Figure 13A:
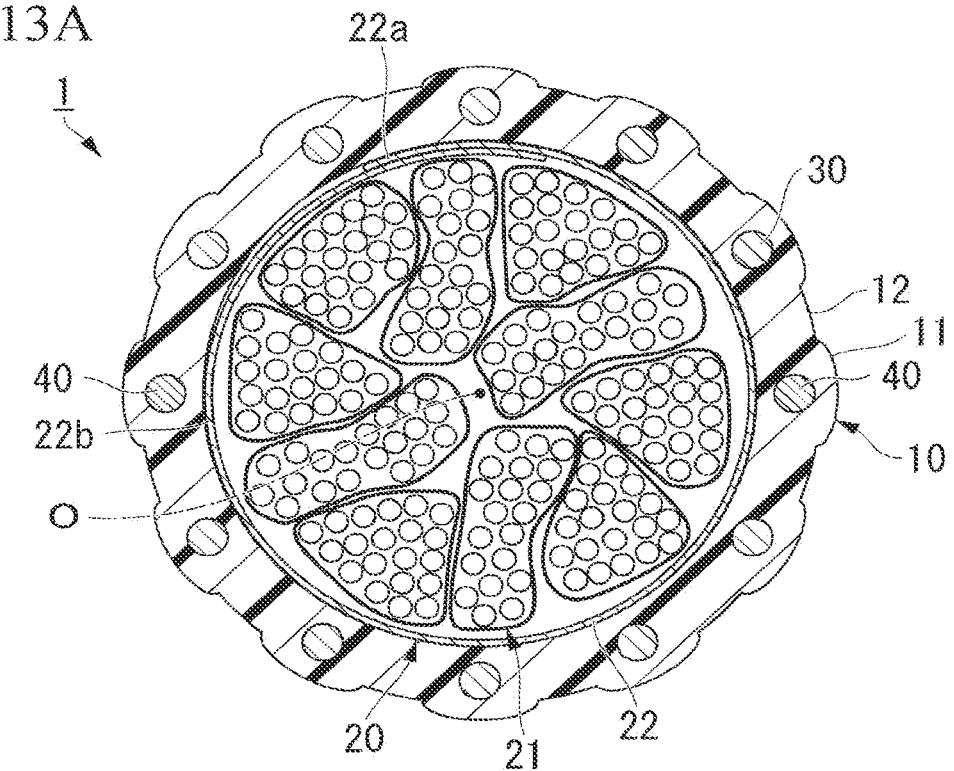
FIG. 13A is a transverse cross-sectional view of an optical fiber cable in which a ripcord is disposed inside a part of the protrusion and a tensile strength member is disposed inside the other protrusion.
Figure 13B:
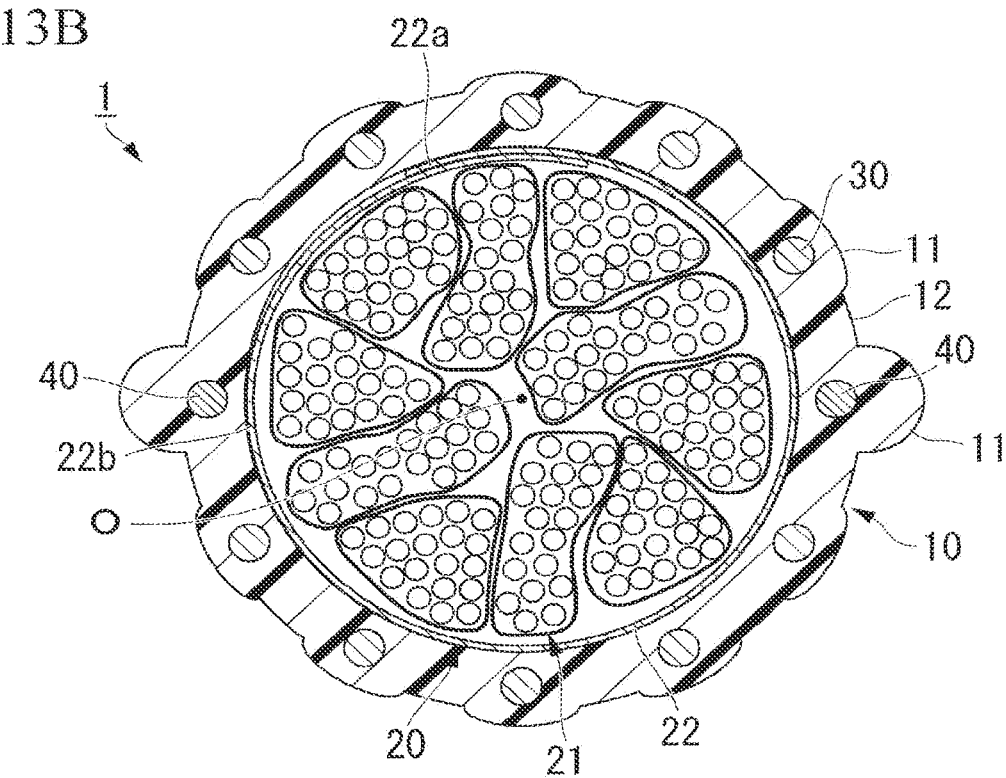
FIG. 13B is a transverse cross-sectional view of an optical fiber cable in which a protrusion in which a ripcord is embedded is projected larger than the other protrusions.
Figure 13C:
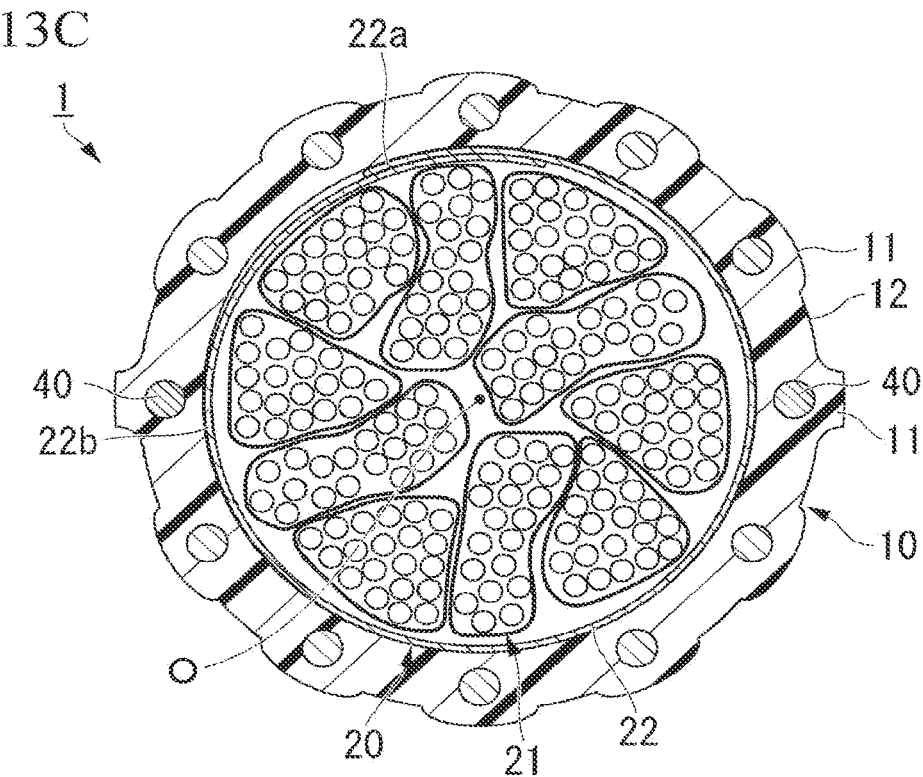
FIG. 13C is a transverse cross-sectional view of an optical fiber cable in which the width of a protrusion in which a ripcord is embedded is smaller than that of other protrusions.

In the optical fiber cable 1 illustrated in FIG. 13A, a part of the tensile strength member 30 is replaced with the ripcord 40 as compared with FIG. 1A. More specifically, two ripcords 40 are embedded inside the protrusions 11 of the sheath 10, and are disposed so as to sandwich the core 20 therebetween.

As the ripcord 40, a yarn obtained by twisting fibers such as polypropylene (PP) and polyester can be used. The tensile strength member 30 has a role of protecting the optical fiber 21a from tension, while the ripcord 40 has a role of tearing the sheath 10. Therefore, the materials of the ripcord 40 and the tensile strength member 30 are different. Specifically, the tensile elastic modulus of the tensile strength member 30 is larger than that of the ripcord 40. Further, the ripcord 40 is more flexible than the tensile strength member 30.

As illustrated in FIG. 13A, by embedding the ripcord 40 inside the protrusion 11 of the sheath 10, the ripcord 40 can be disposed while preventing the sheath 10 from becoming thin. When the core 20 is taken out from the inside of the sheath 10, a part of the protrusion 11 is incised to take out the ripcord 40, and the ripcord 40 is pulled in the longitudinal direction of the optical fiber cable. Thus, the sheath 10 is torn and the core 20 can be taken out.

As illustrated in FIG. 13A, when an optical fiber cable in which a pair of ripcords 40 are disposed so as to sandwich the core 20 is fabricated, the operation of accessing to the core 20 can be performed satisfactorily. The number of ripcords 40 included in the optical fiber cable may be one or three or more.

As described above, in the transverse cross-sectional view, among the plurality of protrusions, the ripcords 40 are positioned inside some of the plurality of protrusions 11 and the tensile strength members 30 are positioned inside the other protrusions 11, which facilitates the operation of accessing to the core 20 in the optical fiber cable while protecting the optical fiber 21a from tension.

Figure 13D:
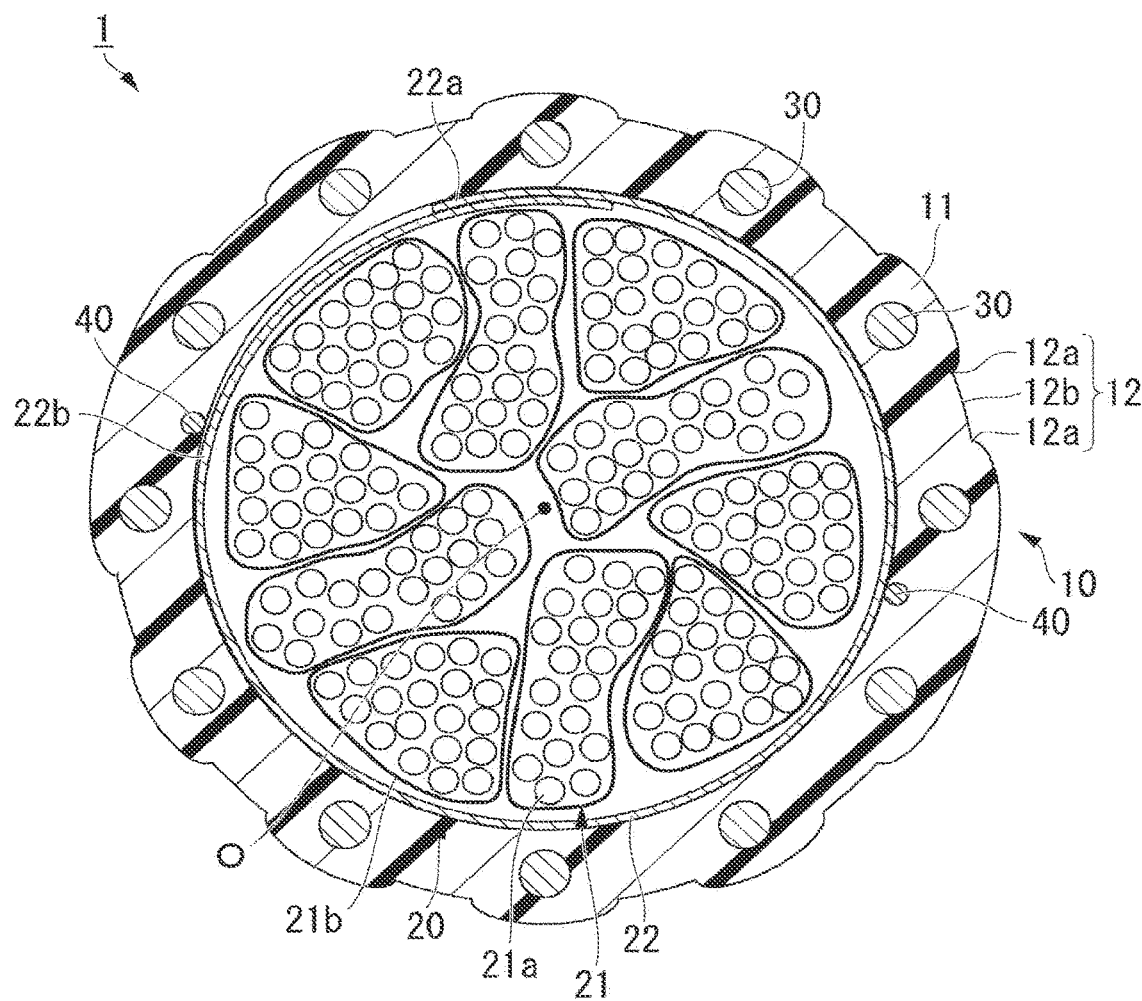
FIG. 13D is a transverse cross-sectional view of an optical fiber cable in which tensile strength members are disposed at equal intervals and ripcords are disposed between the tensile strength members in the circumferential direction.

In order to identify the position where the ripcord 40 is embedded, a marking portion (coloring or the like) may be provided on the protrusion 11 where the ripcord 40 is embedded. Alternatively, as illustrated in FIGS. 13B, 13C, and 13D, the shape of the protrusion 11 in which the ripcord 40 is embedded may be different from the shape of the other protrusions 11. In the example of FIG. 13B, the protrusions 11 in which the ripcords 40 are embedded are projected radially outward more than the other protrusions 11. In the example of FIG. 13C, the width of the protrusions 11 in which the ripcord 40 is embedded in the circumferential direction is smaller than that of the other protrusions 11.

In the example of FIG. 13D, the ripcord 40 is disposed so as to be in contact with the core 20. Further, the tensile strength members 30 are disposed at equal intervals in the circumferential direction, and the ripcords 40 are positioned between adjacent tensile strength members 30 in the circumferential direction. Then, two tensile strength members 30 sandwiching the ripcord 40 are positioned inside one protrusion 11.

By adopting the forms illustrated in FIGS. 13B, 13C, and 13D, the position of the ripcord 40 can be easily recognized from the outside of the optical fiber cable.

It should be noted that the technical scope of the present invention is not limited to the above-described embodiments, and various modifications can be made without departing from the spirit of the present invention.

Figure 14A:
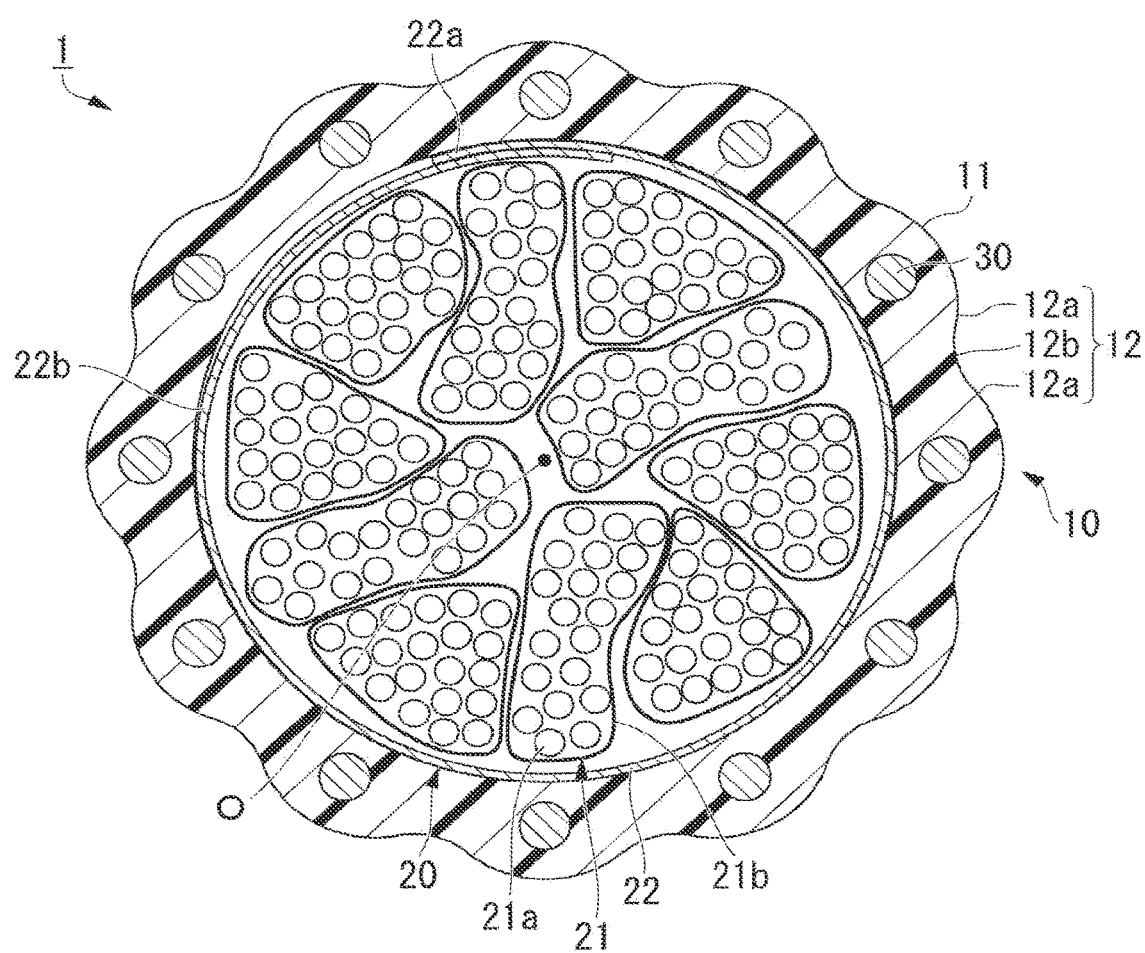
FIG. 14A is a transverse cross-sectional view of an optical fiber cable according to a modification example of one or more embodiments.

For example, as illustrated in FIG. 14A, the inner surface of the recess 12 may be a curved surface that is radially inward convex.

Figure 14B:
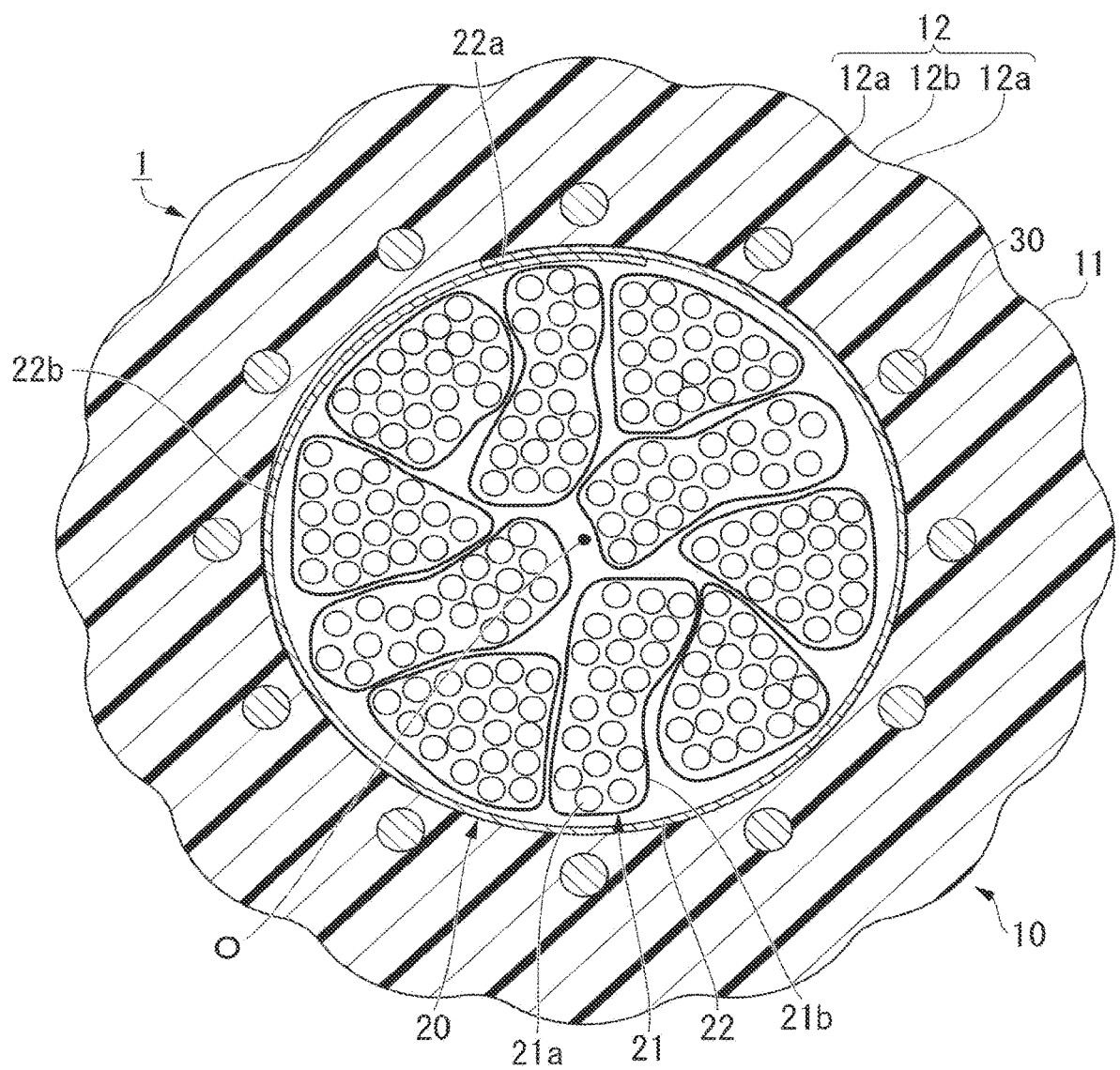
FIG. 14B is a transverse cross-sectional view of an optical fiber cable according to another modification example of one or more embodiments.

Further, as illustrated in FIG. 14B, the number of the protrusions 11 needs not to match the number of the tensile strength members 30. Further, as illustrated in FIG. 14B, the tensile strength member 30 may be disposed at a position closer to the inner circumferential surface than the outer circumferential surface of the sheath 10.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Optical fiber cable
10 Sheath
11 Protrusion
12 Recess
12a Connecting portion
12b Bottom surface
20 Core
21 Optical fiber unit (intermittently-adhered optical fiber ribbon)
21a Optical fiber
21c Adhesive portion
22 Wrapping tube
22a Wrap portion
22b Non-wrap portion
30 Tensile strength member
40 Ripcord
B Base material
M Low friction material

What is claimed is:

1. An optical fiber cable comprising:
a sheath;
a plurality of tensile strength members embedded in the sheath;
a core that is housed in the sheath and comprises an intermittently-adhered optical fiber ribbon comprising: optical fibers; and adhesive portions that intermittently adhere the optical fibers together in a longitudinal direction; and a wrapping tube that wraps the intermittently-adhered optical fiber ribbon, wherein the wrapping tube comprises:

a wrap portion where a first end portion of the wrapping tube overlaps with a second end portion of the wrapping tube; and a non-wrap portion positioned between the first end portion and the second end portion, wherein the optical fiber cable has a compressive strength of 12.8 N/mm² or greater and 32.4 N/mm² or less.

2. The optical fiber cable of claim 1, wherein recesses and protrusions are disposed alternately in a circumferential direction on an outer circumferential surface of the sheath.

3. The optical fiber cable of claim 2, wherein inner surfaces of the recesses are curved surfaces that are radially inwardly convex.

4. The optical fiber cable of claim 2, wherein, in a transverse cross-sectional view, a cross-sectional area of the recesses that is enclosed by closed curves tangent to radial outer ends of the protrusions and all the recesses is 1.3 mm² or greater and 4.8 mm² or less.

5. The optical fiber cable of claim 2, wherein the number of protrusions does not match the number of tensile strength members.

6. The optical fiber cable of claim 1, further comprising a ripcord.

7. The optical fiber cable of claim 6, wherein the ripcord is disposed so as to be in contact with the core.

8. The optical fiber cable of claim 1, wherein the sheath is formed from a polyolefin resin.

9. The optical fiber cable of claim 1, wherein the sheath is formed into a cylindrical shape.

10. The optical fiber cable of claim 1, wherein the number of tensile strength members is between 8 and 12.

11. The optical fiber cable of claim 1, wherein an outer diameter of the sheath is greater than or equal to 6.1 mm.

12. An optical fiber cable comprising:
a sheath;
a plurality of tensile strength members embedded in the sheath;
a core that is housed in the sheath and comprises an intermittently-adhered optical fiber ribbon comprising:
optical fibers; and
adhesive portions that intermittently adhere the optical fibers together in a longitudinal direction; and a wrapping tube that wraps the intermittently-adhered optical fiber ribbon, wherein the wrapping tube comprises:

a wrap portion where a first end portion of the wrapping tube overlaps with a second end portion of the wrapping tube; and a non-wrap portion positioned between the first end portion and the second end portion, wherein the number of tensile strength members is between 8 and 12.

13. The optical fiber cable of claim 12, wherein recesses and protrusions are disposed alternately in a circumferential direction on an outer circumferential surface of the sheath.

14. The optical fiber cable of claim 13, wherein inner surfaces of the recesses are curved surfaces that are radially inwardly convex.

15. The optical fiber cable of claim 13, wherein, in a transverse cross-sectional view, a cross-sectional area of the recesses that is enclosed by closed curves tangent to radial outer ends of the protrusions and all the recesses is 1.3 mm² or greater and 4.8 mm² or less.

16. The optical fiber cable of claim 13, wherein the number of protrusions does not match the number of tensile strength members.

17. The optical fiber cable of claim 12, further comprising a ripcord.

18. The optical fiber cable of claim 17, wherein the ripcord is disposed so as to be in contact with the core.

19. The optical fiber cable of claim 12, wherein the sheath is formed from a polyolefin resin.

20. The optical fiber cable of claim 12, wherein the sheath is formed into a cylindrical shape.

21. The optical fiber cable of claim 12, wherein an outer diameter of the sheath is greater than or equal to 6.1 mm.

* * * * *